(12) United States Patent
Yoneyama

(10) Patent No.: US 7,682,275 B2
(45) Date of Patent: Mar. 23, 2010

(54) AUTOMATIC TRANSMISSION CONTROL APPARATUS

(75) Inventor: Nobuyuki Yoneyama, Suntou-gun (JP)

(73) Assignee: Jatco Ltd, Fuji-shi (JP)

( * ) Notice: Subject to any disclaimer, the term of this patent is extended or adjusted under 35 U.S.C. 154(b) by 417 days.

(21) Appl. No.: 11/751,189

(22) Filed: May 21, 2007

(65) Prior Publication Data

US 2007/0298932 A1 Dec. 27, 2007

(30) Foreign Application Priority Data

Jun. 22, 2006 (JP) ............................. 2006-172016

(51) Int. Cl.
*F16H 31/00* (2006.01)
(52) U.S. Cl. ....................... 475/119; 477/906
(58) Field of Classification Search ........................ None
See application file for complete search history.

(56) References Cited

U.S. PATENT DOCUMENTS

| | | | | |
|---|---|---|---|---|
| 5,778,330 | A * | 7/1998 | McKee | 701/62 |
| 6,086,512 | A * | 7/2000 | Kondo | 477/125 |
| 6,259,984 | B1 * | 7/2001 | Kanzaki et al. | 701/51 |
| 6,351,700 | B1 * | 2/2002 | Muramoto et al. | 701/51 |
| 7,120,531 | B1 * | 10/2006 | Melby et al. | 701/57 |
| 7,517,302 | B2 * | 4/2009 | Kobayashi et al. | 477/125 |
| 2007/0265756 | A1 * | 11/2007 | Joyce et al. | 701/51 |

FOREIGN PATENT DOCUMENTS

| | | |
|---|---|---|
| JP | H09-133203 | 5/1997 |
| JP | H11-280898 | 10/1999 |
| JP | 2000-240785 | 9/2000 |
| JP | 2004-068989 | 3/2004 |

* cited by examiner

*Primary Examiner*—David D Le
*Assistant Examiner*—Justin Holmes
(74) *Attorney, Agent, or Firm*—Global IP Counselors, LLP

(57) ABSTRACT

An automatic transmission control apparatus is provided with a shift control section, a first rotary-speed detecting section, a second rotary-speed detecting section and an input shaft speed calculation section. The shift control section issues instructions to selectively engage and disengage a combination of a plurality of frictionally engaging elements of a planetary gear mechanism to establish a corresponding one of a plurality of gear ratios. The first rotary-speed detecting section detects a rotational speed of a first rotary member which rotates at a different speed from an input shaft of the planetary gear mechanism. The second rotary-speed detecting section detects a rotational speed of a second rotary member which rotates at a different speed from the input shaft of the planetary gear mechanism. The input shaft speed calculation section calculates a rotational speed of the input shaft using values detected by the first and second rotary-speed detecting sections.

8 Claims, 10 Drawing Sheets

|  | B1 | C1 | C2 | C3 | B2 | B3 | B4 | F1 | F2 |
|---|---|---|---|---|---|---|---|---|---|
| 1st | (O) |  |  | (O) | O |  |  | O | O |
| 2nd |  |  |  | (O) | O | O |  |  | O |
| 3rd |  |  | O |  | O | O |  |  |  |
| 4th |  |  | O | O |  | O |  |  |  |
| 5th |  | O | O | O |  |  |  |  |  |
| 6th |  | O |  | O |  | O |  |  |  |
| 7th | O | O |  | O |  |  |  | O |  |
| Rev. | O |  |  | O |  |  | O |  |  |

Fig. 2

(a) DISENGAGEMENT BY MISTAKE OF "2346" BRAKE B3

2.5th (b) DISENGAGEMENT BY MISTAKE OF H&LR CLUTCH C3

NEUTRAL (c) DISENGAGEMENT BY MISTAKE OF DIRECT CLUTCH C2

NEUTRAL (a) DISENGAGEMENT BY MISTAKE OF INPUT CLUTCH C1

2.5th

R2  R1,PC2  PC1  S1,S2  R4  R3,PC4  PC3  S3,S4

(b) DISENGAGEMENT BY MISTAKE OF H&LR CLUTCH C3

NEUTRAL (c) DISENGAGEMENT BY MISTAKE OF DIRECT CLUTCH C2

NEUTRAL (a) DISENGAGEMENT BY MISTAKE OF "2346" BRAKE B3

(b) DISENGAGEMENT BY MISTAKE OF INPUT CLUTCH C1

(c) DISENGAGEMENT BY MISTAKE OF H&LR CLUTCH C3

(a) DISENGAGEMENT BY MISTAKE OF INPUT CLUTCH C1

(b) DISENGAGEMENT BY MISTAKE OF H&LR CLUTCH C3

(c) DISENGAGEMENT BY MISTAKE OF FRONT BRAKE B1

AUTOMATIC TRANSMISSION CONTROL APPARATUS

CROSS-REFERENCE TO RELATED APPLICATIONS

This application claims priority to Japanese Patent Application No. 2006-172016, filed on Jun. 22, 2006. The entire disclosure of Japanese Patent Application No. 2006-172016 is hereby incorporated herein by reference.

BACKGROUND OF THE INVENTION

1. Field of the Invention

The present invention generally relates to an automatic transmission control apparatus. More specifically, the present invention relates to a technology of determining which one of a plurality of frictionally engaging elements in an automatic transmission is malfunctioning (e.g., mistakenly disengaged) so as to cause the automatic transmission to fail and present a neutral state.

2. Background Information

In a geared automatic transmission, each of the gear ratios is achieved by selectively engaging and releasing a plurality of clutches and brakes (each generically referred to as a "frictional engaging element"). In some automatic transmissions, a planetary gearing is included, such as the one described in Japanese Laid-Open Patent Publication No. 2000-240785. This Japanese publication also discloses forcing an automatic transmission, which has a turbine speed sensor to detect a speed of a rotation of a turbine shaft, to shift to a safe (non-malfunctioning) gear after determining that a portion of the automatic transmission has failed.

In addition, this Japanese Laid-Open Patent Publication No. 2000-240785 discloses calculating a real gear ratio from a detected turbine speed and a detected output speed and then determining that the automatic transmission fails when the real gear ratio continues to differ from an instructed gear ratio for a predetermined time. Next, it determines the portion which fails by comparing the real gear ratio to the instructed gear ratio upon determination that the automatic transmission fails. And, it possesses a map set beforehand depending on the current instructed gear ratio and the portion which fails, forcing the automatic transmission to shift to a predetermined gear.

In view of the above, it will be apparent to those skilled in the art from this disclosure that there exists a need for an improved automatic transmission control apparatus. This invention addresses this need in the art as well as other needs, which will become apparent to those skilled in the art from this disclosure.

SUMMARY OF THE INVENTION

It has been discovered that in the case of an automatic transmission such as disclosed by the above mentioned Japanese publication, a turbine shaft is not covered by any rotary member so that a rotary-speed sensor may directly detect a speed of a rotation of the turbine shaft in order to indirectly detect a speed of a rotation of an input shaft of the transmission (i.e., the rotational speed of the input shaft of the transmission is equal to the rotational speed of the turbine shaft). However, in recent years, multistage automatic transmissions have become more advanced with a more complicated gear train. Thus, there is an increasing possibility that a rotation speed of an input shaft of the transmission may not be directly detected by a rotary-speed sensor. If the speed of a transmission input shaft is not directly detected, there is a problem that even if an attempt is made to perform various kinds of control requiring gear ratio information as necessary information using an input shaft speed information and a gear ratio information using the input shaft speed information, high precision control cannot be expected.

In addition, the above-mentioned Japanese publication determines the portion which fails by comparing a real gear ratio to an instructed gear ratio when an automatic transmission fails due to disengagement by mistake or engagement by mistake of a frictionally engaging element. However, if the automatic transmission fails and presents a neutral state due to disengagement by mistake of a frictionally engaging element, comparing the real gear ratio to the instructed gear ratio makes it impossible to determine the frictionally engaging element which causes the automatic transmission to fail. This is because the real gear ratio which appears when the automatic transmission fails, always changes depending on engine speed (that changes depending on accelerator opening degree). A rise or a fall in engine speed causes a rise (or a fall) in turbine speed, causing, as a result, a rise or a fall in real gear ratio. Therefore, it is not possible to set the threshold for the real gear ratio, which always changes depending on engine speed. Also it is not possible to determine the portion which fails when the automatic transmission fails and presents a neutral state, making it possible to output only a fail signal indicating that the automatic transmission fails and presents a neutral state. Therefore, there is a problem that the automatic transmission cannot shift to a safe (non-malfunctioning) gear ratio even though it is kept in neutral. In other words, it impossible to conduct a fail safe control that secures a shift to the safe (non-malfunctioning) gear ratio, when the automatic transmission fails and presents a neutral state due to disengagement by mistake of a frictionally engaging element because it is not possible to determine which of the frictionally engaging elements is malfunctioning (i.e., either failed or disengaged by mistake).

In view of the above-mentioned problem, one object of the present invention is to secure detection of a speed of a rotation of an input shaft even in complicated gear trains of multistage automatic transmissions.

In order to accomplish the above-mentioned object, an automatic transmission control apparatus is basically provided with a shift control section, a first rotary-speed detecting section, a second rotary-speed detecting section and an input shaft speed calculation section. The shift control section is configured to issue instructions to selectively engage and disengage a combination of a plurality of frictionally engaging elements of a planetary gear mechanism to establish a corresponding one of a plurality of gear ratios. The first rotary-speed detecting section is configured to detect a rotational speed of a first rotary member which rotates at a different speed from an input shaft of the planetary gear mechanism. The second rotary-speed detecting section is configured to detect a rotational speed of a second rotary member which rotates at a different speed from the input shaft of the planetary gear mechanism. The input shaft speed calculation section is configured to calculate a rotational speed of the input shaft using values detected by the first and second rotary-speed detecting sections.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a clutch engagement truth table corresponding with the first embodiment of the automatic transmission to provide the seven forward speeds and one reverse speed;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
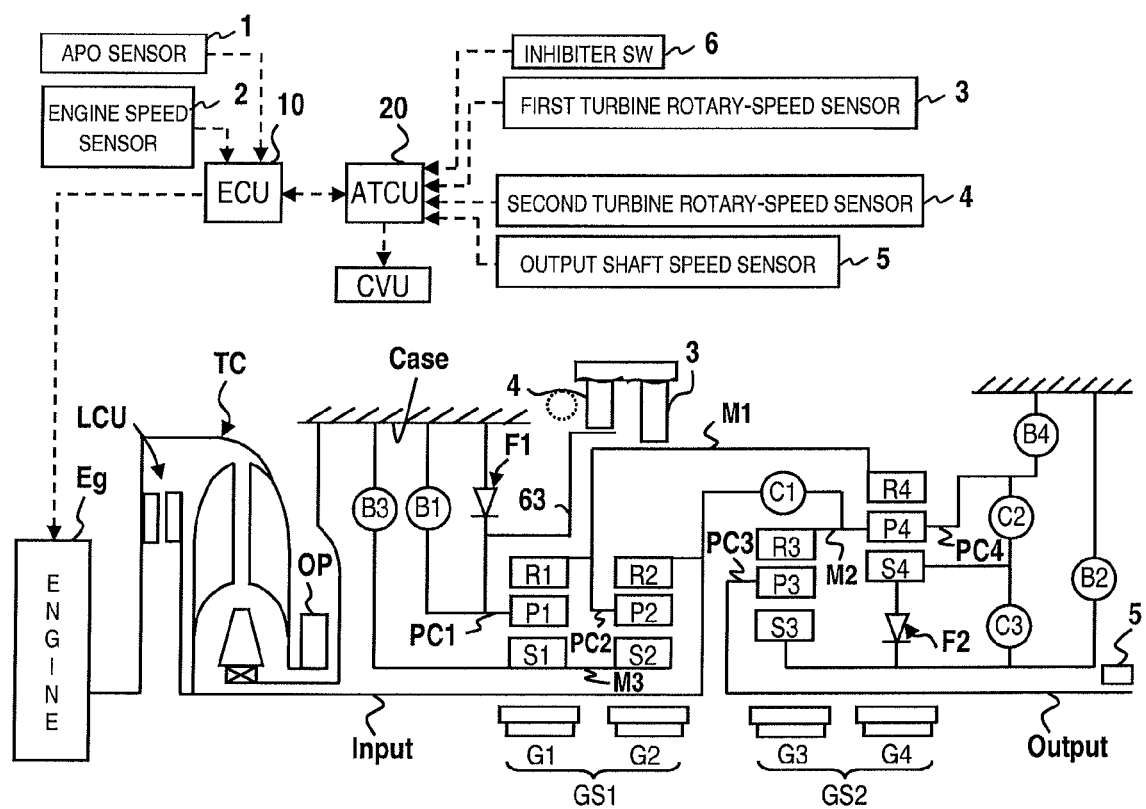
FIG. 1 is a skeleton diagram showing the constitution of a first embodiment of an automatic transmission of the FR type and providing seven forward speeds and one reverse speed.

Referring initially to FIG. 1, an automatic transmission is schematically illustrated in accordance with a first embodiment of the present invention. FIG. 1 includes a skeleton view showing an automatic transmission, which a first embodiment of a control apparatus is applied to, of the type having forward 7-speed and reverse one speed, and the overall system view showing the architecture of the control apparatus for the automatic transmission. The automatic transmission is connected to an engine Eg via a torque converter TC with a lock-up clutch LUC. A rotation outputted by the engine Eg rotatably drives a pump impeller of the torque converter TC and an oil pump OP. Oil stirred by this rotation of the pump impeller is transmitted via a stator to a turbine runner, driving an input shaft "input".

Basically, the automatic transmission includes a first planetary gear set GS1 (a first planetary gear G1 and a second planetary gear G2), and a second planetary gear set GS2 (a third planetary gear G3 and a fourth planetary gear G4). The first and second planetary gear sets GS1 and GS2 constitute a planetary gear mechanism. The planetary gears G1, G2, G3 and GS4 are arranged in this order in an axial direction from an input shaft "Input" toward the output shaft "Output". In addition, the automatic transmission includes a plurality of clutches C1, C2 and C3 and a plurality of brakes B1, B2, B3 and B4. The clutches C1, C2, and C3 and the brakes B1, B2, B3 and B4 are arranged as a plurality of frictionally engaging elements that change rotations of rotary members of the planetary gear mechanism selectively. In addition, the automatic transmission includes a plurality of one-way clutches F1 and F2.

In addition, the control apparatus includes an engine controller unit (ECU) 10, an automatic transmission control unit (ATCU) 20 and a control valve unit (CVU). The engine controller unit (ECU) 10 controls a driving status of the engine Eg. The automatic transmission control unit (ATCU) 20 controls shift status of the automatic transmission. The control valve unit (CVU) conducts hydraulic control to each of frictionally engaging elements based on output signals from the ATCU 20. The ATCU 20 and the control valve unit CVU constitute a shift control section that is configured to issue instructions to selectively engage and disengage a combination of a plurality of frictionally engaging elements of a planetary gear mechanism to establish a corresponding one of a plurality of gear ratios. In addition, the ECU 10 and the ACTU 20 are connected to each other by a CAN communication line, and they share sensor information and control information by communication mutually.

The ECU 10 has connected thereto an accelerator pedal opening (APO) sensor 1, which detects a driver's input to an accelerator pedal, and an engine speed (rpm) sensor 2, which detects an engine speed (rpm). The ECU 10 controls a fuel injection quantity and a throttle opening degree based on the driver's input to the accelerator pedal and the engine speed, thus controlling the engine output speed and the engine torque.

The ATCU 20 has connected thereto a first turbine speed sensor 3, a second turbine speed sensor 4, an output shaft speed sensor 5 and an inhibitor switch 6. The first turbine speed sensor 3 constitutes a first rotary-speed detecting section that is configured to detect a rotational speed of a first rotary member of the planetary gear mechanism which rotates at a different speed from an input shaft of the planetary gear mechanism. In particular, the first turbine speed sensor 3 detects a speed of a rotation of a later described first connection member M1 (e.g., the first rotary member that includes a first ring gear R1, a second carrier PC2 and a fourth ring gear R4). The second turbine speed sensor 4 constitutes a second rotary-speed detecting section that is configured to detect a rotational speed of a second rotary member of the planetary gear mechanism which rotates at a different speed from the input shaft of the planetary gear mechanism. In particular, the second turbine speed sensor 3 detects a speed of a rotation a first carrier PC1 (e.g., the second rotary member). The output shaft speed sensor 5 constitutes an output shaft speed detection section that is configured to detect a rotational speed of the output shaft "Output" of the planetary gear mechanism.

The inhibitor switch 6 is configured to detect a driver's input to a shift lever. The shift lever includes an engine braking range position, a normal forward drive range position, a park "P" position, a reverse "R" position, and a drive "D" position. In the engine braking range position, engine braking is effective, while no engine braking is occurs in the normal forward drive range position.

The ATCU 20 is provided with an input speed calculation section and a shift control section. The input speed calculation section calculates a speed of a rotation of an input shaft "Input". The shift control section normally selects an optimum gear ratio, as an instructed gear ratio, out of a later described shift scheduling map providing seven forward gear ratios based on the vehicle's speed Vsp and an accelerator pedal opening APO and outputs a control order that a certain shift should occur to accomplish the optimum instructed gear ratio to a control valve unit CVU. In addition, the constitution of the speed calculation section is described later.

The first planetary gear G1 is a planetary gear of the single pinion type that includes a first sun gear S1, a first ring gear R1, and a first carrier PC1 that supports first pinions P1, each meshing both of the gears S1 and R1.

The second planetary gear G2 is a planetary gear of the single pinion type that includes a second sun gear S2, a second ring gear R2, and a second carrier PC2 that supports second pinions P2, each meshing both of the gears S2 and R2.

The third planetary gear G3 is a planetary gear of the single pinion type that includes a third sun gear S3, a third ring gear R3, and a third carrier PC3 that supports third pinions P3, each meshing both of the gears S3 and R3.

The fourth planetary gear G4 is a planetary gear of the single pinion type that includes a fourth sun gear S4, a fourth ring gear R4, and a fourth carrier PC4 that supports fourth pinions P4, each meshing both of the gears S4 and R4.

The input shaft "Input" is connected to the second ring gear R2, and inputs a rotary driving force from the engine "Eg" via the torque converter TC.

The output shaft "Output" is connected to the third carrier PC3, and transmits an output rotary driving force to driving wheels via a final gear ratio, out of the frame.

The first connection member M1 is a member that connects the first ring gear R1, the second carrier PC2, and the fourth ring gear R4 one after another for rotation as one body.

The second connection member M2 is a member that connects the third ring gear R3 and the fourth carrier PC4 with each other for rotation as one body.

The third connection member M3 is a member that connects the first sun gear S1 and the second sun gear S2 with each other for rotation as one body.

The first planetary gear set GS1 includes four rotary elements by interconnecting the first planetary gear G1 and the second planetary gear G2 by the first connection member M1 and the third connection member M3. In addition, the second planetary gear set GS2 includes five rotary elements by interconnecting the third planetary gear G3 and the fourth planetary gear G4 by the second connection member M2.

The first planetary gear set GS1 forms a torque input path for a torque transmitted to the second ring gear R2 from the input shaft "Input". The first planetary gear set GS1, which inputs the torque, outputs a torque toward the second planetary gear set GS2 from the first connection member M1.

The second planetary gear set GS2 has a torque input path for a torque transmitted to the second connection member M2 from the input shaft "Input", and another torque input path for a torque transmitted to the fourth ring gear R4 from the first connection member M1. The second planetary gear set GS2, which inputs the torques, outputs a torque toward the output shaft "Output" from the third carrier PC3.

In addition, when, with an high and low reverse (H&LR) clutch C3 being disengaged, the fourth sun gear S4 turns at a higher speed than the third sun gear S3 does, the third sun gear S3 and the fourth sun gear S4 produce speeds independently. Therefore, the third planetary gear G3 and the fourth planetary gear G4, which remain connected with each other by the second connection member M2, accomplish independent gear ratios, respectively.

An input clutch C1 is a clutch that selectively connects the input shaft "Input" to the second connection member M2.

A direct clutch C2 is a clutch that selectively connects the fourth sun gear S4 to the fourth carrier PC4.

The H&LR clutch C3 is a clutch that selectively connects the third sun gear S3 to the fourth sun gear S4. In addition, there is a second one-way clutch F2 between the third sun gear S3 and the fourth sun gear S4.

A front brake B1 is a brake that selectively stops a rotation of the first carrier PC1. Moreover, there is a first one-way clutch F1 in parallel to the front brake B1.

A low brake B2 is a brake that selectively stops a rotation of the third sun gear S3.

A "2346" brake B3 is a brake that selectively stops a rotation of the third connection member M3 (the first sun gear S1 and the second sun gear S2).

A reverse brake B4 is a brake that selectively stops a rotation of the fourth carrier PC4.

Calculation of Turbine Speed

In view of the fact that the input shaft "Input" is connected to the second ring gear R2 and, furthermore, the first planetary gear G1 and the second planetary gear G2 constitute the first planetary gear set GS1 with two rotary elements of one planetary gear connected to two rotary elements of the other planetary gear, the speed calculation section within the ATCU 20 detects the input shaft "Input" speed by calculation using the two turbine speed sensors 3 and 4.

In particular, the input shaft "Input" speed is given by a speed of a rotation N(R2) of the second ring gear R2 that may be expressed by the following formula:

$$N(R2) = (1+1/\beta) - (1/\beta) \cdot N(PC1)$$

where

Figure 3:
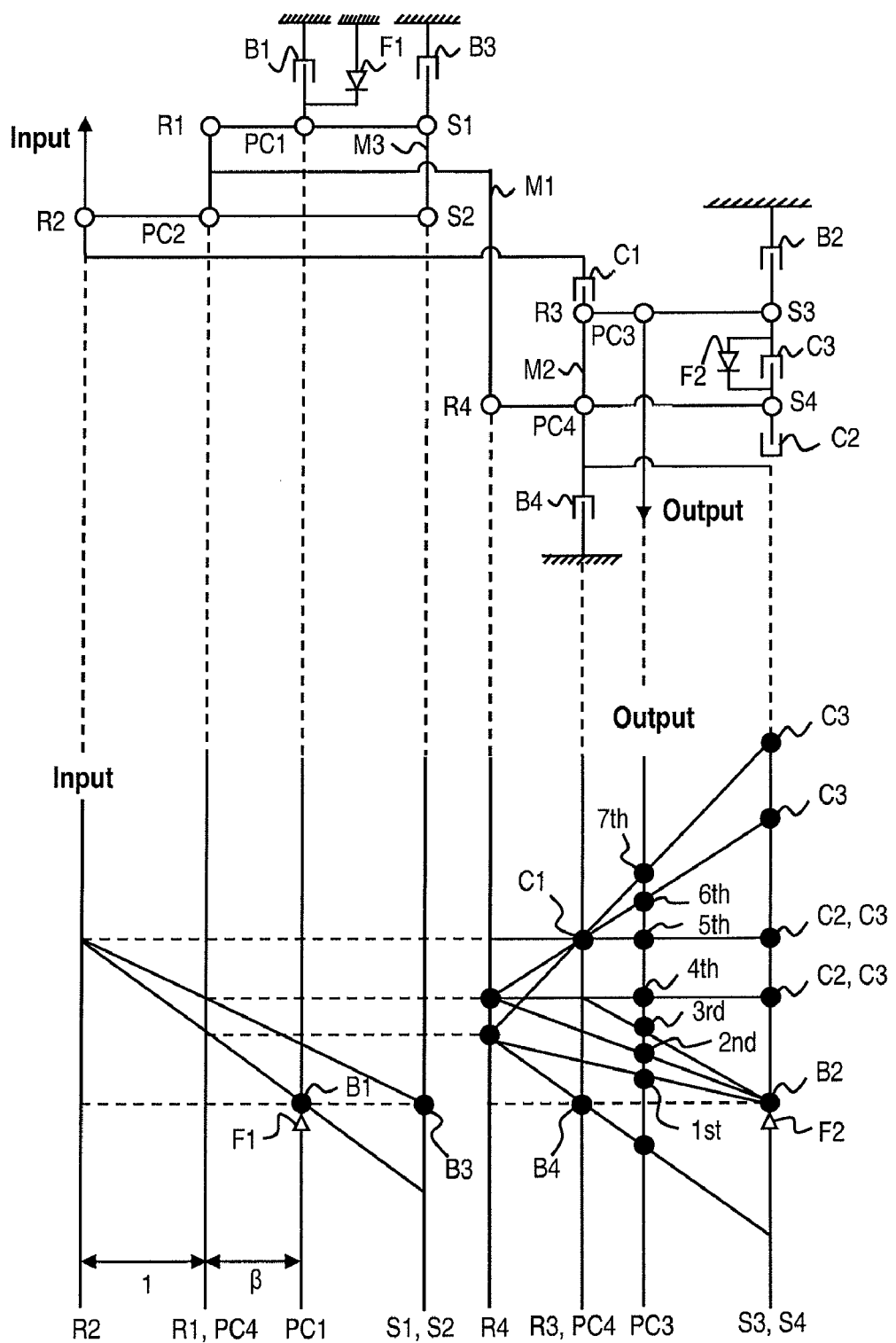
FIG. 3 is a lever diagram showing a rotary state of each of rotary members at each of gear ratios to be established in the first embodiment of the automatic transmission providing the seven forward speeds and one reverse speed.

N(PC1) is a speed of a rotation of the first carrier PC1,

N(PC2) is a speed of a rotation of the second carrier PC2,

N(R2) is a speed of a rotation of the second ring gear R2; and a gear ratio between the second ring gear R2 and the second carrier PC2 (the first ring gear R1) is assumed to be 1, and a gear ratio between the first ring gear R1 (the second carrier PC2) and the first carrier PC1 is assumed to be β as shown in a lever diagram of FIG. 3.

The first turbine speed sensor 3 detects a speed of a rotation of the second carrier PC2, and the second turbine speed sensor 4 detects a speed of a rotation of a sensor member 63 connected, as a turbine sensor member, to the first carrier PC1. This allow detection of a speed of a rotation of the second ring gear R2 (input shaft "Input", hereinafter, called a turbine speed) by calculation based on the above-mentioned formula.

Engagement of Frictionally Engaging Elements in Each Gear Ratio

FIG. 2 is an engagement table for seven forward speeds and one reverse speed to be established in a gear transmission for an automatic transmission according to the first embodiment, and FIG. 3 is a lever diagram showing the state of a rotation of each of members in each of gear ratios for seven forward speeds and one reverse speed to be established in the gear transmission for the automatic transmission.

First Speed

At the first speed, different frictionally engaging elements act for engine braking action (upon selection of the engine braking range position) and for engine braking non-action (upon selection of the normal forward drive range position). For engine braking action, as indicated at (○) in FIG. 2, the front brake B1, the low brake B2, and the H&LR clutch C3 are engaged. In addition, the first one-way clutch F1, which is arranged in parallel to the front brake B1, and the second one-way clutch F2, which is arranged in parallel to the H&LR clutch C3, also participate in the torque transmission. For engine braking non-action, the front brake B1 and the H&LR clutch C3 are disengaged, and only the low brake B2 is engaged so that the first one-way clutch F1 and the second one-way clutch F2 may transmit torque.

At the first speed, because the front brake B1 is engaged (i.e., the first one-way clutch F1 is engaged for engine braking non-action), the first planetary gear set GS1, which inputs via the second ring gear R2 a rotation from the input shaft "Input", reduces the speed of the rotation. The first planetary gear set GS1 outputs the rotation at the reduced speed via the first connection member M1 toward the fourth ring gear R4. Because the low brake B2 and the H&LR clutch C3 are engaged (i.e., the low brake B2 and the second one-way clutch F2 are engaged for engine braking non-action), the second planetary gear set GS2, which inputs via the fourth ring gear R4 the rotation, reduces the speed of this input rotation for output via the third carrier PC3.

In other words, as shown in FIG. 3, the first speed is prescribed by a line linking a point, which is determined by reducing the speed of output rotation of the engine due to engagement of the front brake B1, and another point at which the low brake B2, which is provided to reduce the speed of the rotation at the reduced speed from the first planetary gear set GS1, is engaged, reducing the speed of input rotation from the input shaft "Input" to output the rotation at the reduced speed via the output shaft "Output".

With regard to torque flow at the first speed, torque acts on the front brake B1 (or the first one-way clutch F1), the low brake B2, the H&LR clutch C3 (or the second one-way clutch F2), the first connection member M1, the second connection member M2, and the third connection member M3. In short, the first planetary gear set GS1 and the second planetary gear set GS2 participate in the torque transmission.

Second Speed

At the second speed, different frictionally engaging elements act for engine braking action (upon selection of the engine braking range position) and for engine braking non-action (upon selection of the normal forward drive range position). For engine braking action, as indicated at (○) in FIG. 2, the low brake B2, the "2346" brake B3, and the H&LR clutch C3 are engaged. In addition, the second one-way clutch F2, which is arranged in parallel to the H&LR clutch C3, also participates in the torque transmission. For engine braking non-action, the H&LR clutch C3 is disengaged, and the low brake B2 and the "2346" brake B3 are engaged so that the second one-way clutch F2 may transmit torque.

At the second speed, because the "2346" brake B3 is engaged, only the second planetary gear G2, which inputs via the second ring gear R2 a rotation from the input shaft "Input", reduces the speed of the rotation. The second planetary gear G2 outputs the rotation at the reduced speed via the first connection member M1 toward the fourth ring gear R4. Because the low brake B2 and the H&LR clutch C3 are engaged (i.e., the second one-way clutch F2 is engaged for engine braking non-action), the second planetary gear set GS2, which inputs via the fourth ring gear R4 the rotation, reduces the speed of this input rotation for output via the third carrier PC3.

In other words, as shown in FIG. 3, the second speed is prescribed by a line linking a point, which is determined by reducing the speed of output rotation of the engine due to engagement of the "2346" brake B3, and another point at which the low brake B2, which is provided to reduce the speed of the rotation at the reduced speed from the second planetary gear G2, is engaged, reducing the speed of input rotation from the input shaft "Input" to output the rotation at the reduced speed via the output gear "Output".

With regard to torque flow at the second speed, torque acts on the "2346" brake B3, the low brake B2, the H&LR clutch C3 (or the second one-way clutch F2), the first connection member M1, the second connection member M2, and the third connection member M3. In short, the second planetary gear G2 and the second planetary gear set GS2 participate in the torque transmission.

In addition, for an upshift from the first speed to the second speed, the first one-way clutch F1 is disengaged at the time the engagement capacity of the "2346" brake B3 is secured by disengaging the front brake B1 early and starting engagement of the "2346" brake B3. Therefore, this makes it possible to plan improvement of precision of shift timing.

Third Speed

As shown in FIG. 2, the third speed is established by engaging the "2346" brake B3, the low brake B2 and the direct clutch C2.

At the third speed, because the "2346" brake B3 is engaged, the second planetary gear G2, which inputs via the second ring gear R2 a rotation from the input shaft "Input", reduces the speed of the rotation. The second planetary gear G2 outputs the rotation at the reduced speed via the first connection member M1 toward the fourth ring gear R4. And, because the direct clutch C2 is engaged, the fourth planetary gear G4 turns as a body. And, because the low brake B2 is engaged, the third planetary gear G3, which inputs via the third ring gear R3 the rotation transmitted by the second connection member M2 from the fourth carrier PC4 that turns as a body together with the fourth ring gear R4, reduces the speed of this input rotation for output via the third carrier PC3. In this way, the fourth planetary gear G4 does not participate in the speed reduction, but it participates in the torque transmission.

In other words, as shown in FIG. 3, the third speed is prescribed by a line linking a point, which is determined by reducing the speed of output rotation of the engine due to engagement of the "2346" brake B3, and another point at which the low brake B2, which is provided to reduce the speed of the rotation at the reduced speed from the second planetary gear G2, is engaged, reducing the speed of input rotation from the input shaft "Input" to output the rotation at the reduced speed via the output gear "Output".

With regard to torque flow at the third speed, torque acts on the "2346" brake B3, the low brake B2, the direct clutch C2, the first connection member M1, the second connection member M2, and the third connection member M3. In short, the second planetary gear G2 and the second planetary gear set GS2 participate in the torque transmission.

In addition, for an upshift from the second speed to the third speed, the second one-way clutch F2 is disengaged at the time the engagement capacity of the direct clutch C2 is secured by disengaging the H&LR clutch C3 early and starting engagement of the direct clutch C2. Therefore, this makes it possible to plan improvement of precision of shift timing.

Fourth Speed

As shown in FIG. 2, the fourth speed is established by engaging the "2346" brake B3, the direct clutch C2, and the H&LR clutch C3.

At the fourth speed, because the "2346" brake B3 is engaged, only the second planetary gear G2, which inputs via the second ring gear R2 a rotation from the input shaft "Input", reduces the speed of the rotation. The second planetary gear G2 outputs the rotation at the reduced speed via the first connection member M1 toward the fourth ring gear R4. And, because the direct clutch C2 and H&LR clutch C3 are engaged, the second planetary gear set GS2 turns as a body. Therefore, the rotation which is fed to the fourth ring gear R4 is outputted as it is via the third carrier PC3.

In other words, as shown in FIG. 3, the fourth speed is prescribed by a line linking a point, which is determined by reducing the speed of output rotation of the engine due to engagement of the "2346" brake B3, and another point at which the direct clutch C2 and the H&LR clutch C3, which are provided to output the speed of the rotation at the reduced speed from the second planetary gear G2 as it is, are engaged, reducing the speed of input rotation from the input shaft "Input" to output the rotation at the reduced speed via the output gear "Output".

With regard to torque flow at the fourth speed, torque acts on the "2346" brake B3, the direct clutch C2, the H&LR clutch C3, the first connection member M1, the second connection member M2, and the third connection member M3. In short, the second planetary gear G2 and the second planetary gear set GS2 participate in the torque transmission.

Fifth Speed

As shown in FIG. 2, the fifth speed is established by engaging the input clutch C1, the direct clutch C2, and the H&LR clutch C3.

At the fifth speed, because the input clutch C1 is engaged, a rotation of the input shaft "Input" is fed to the second connection member M2 as it is. Because the direct clutch C2 and the H&LR clutch C3 are engaged, the third planetary gear G3 turns as a body. Therefore, the rotation of the input shaft "Input" is outputted via the third carrier PC3 as it is.

In other words, as shown in FIG. 3, the fifth speed is prescribed by a line linking a point at which the input clutch C1, which is provided to output the speed of output rotation of the engine as it is, is engaged and another point at which the direct clutch C2 and the H&LR clutch C3 are engaged, outputting the rotation fed from the input shaft "Input" via the output gear "Output" as it is.

With regard to torque flow at the fifth speed, torque acts on the input clutch C1, the direct clutch C2, the H&LR clutch C3, the first connection member M1, and the second connection member M2. In short, only the third planetary gear G3 participates in the torque transmission.

Sixth Speed

As shown in FIG. 2, the sixth speed is established by engaging the input clutch C1, the H&LR clutch C3, and the "2346" brake B3.

At the sixth speed, because the input clutch C1 is engaged, a rotation of the input shaft "Input" is fed to the second ring gear R2 and to the second connection member M2. In addition, because the "2346" brake B3 is engaged, the second planetary gear G2 reduces the speed of the rotation and outputs the rotation at the reduced speed via the first connection member M1 to the fourth ring gear R4. Because the H&LR clutch C3 is engaged, the second planetary gear set GS2 outputs via the third carrier C3 a rotation prescribed by the rotation of the fourth ring gear R4 and the rotation of the second connection member M2.

In other words, as shown in FIG. 3, the sixth speed is prescribed by a line linking a point, which is determined by reducing the speed of output rotation of the engine due to engagement of the "2346" brake B3, and a point, which is determined by transmitting the output rotation of the engine to the second connection member M2 as it is due to engagement of the input clutch C1 and by constituting the second planetary gear set GS2 due to engagement of the H&LR clutch C3, increasing the speed of input rotation from the input shaft "Input" to output the rotation at the increased speed via the output gear "Output".

With regard to torque flow at the sixth speed, torque acts on the input clutch C1, the direct clutch C2, the H&LR clutch C3, the "2346" brake B3, the first connection member M1, the second connection member M2, and the third connection member M3. In short, the second planetary gear G2 and the second planetary gear set GS2 participate in the torque transmission.

Seventh Speed

As shown in FIG. 2, the seventh speed is established by engaging the input clutch C1, the H&LR clutch C3, and the front brake B1 (or the first one-way clutch F1).

At the seventh speed, because the input clutch C1 is engaged, a rotation of the input shaft "Input" is fed to the second ring gear R2 and to the second connection member M2. In addition, because the front brake B1 is engaged, the first planetary gear set GS1 reduces the speed of the rotation and outputs the rotation at the reduced speed via the first connection member M1 to the fourth ring gear R4. In addition, because the H&LR clutch C3 is engaged, the second planetary gear set GS2 outputs via the third carrier PC3 a rotation prescribed by the rotation of the fourth ring gear R4 and the rotation of the second connection member M2.

In other words, as shown in FIG. 3, the seventh speed is prescribed by a line linking a point, which is determined by reducing the speed of output rotation of the engine by the first planetary gear set GS1 due to engagement of the front brake B1, and a point, which is determined by transmitting the output rotation of the engine to the second connection member M2 as it is due to engagement of the input clutch C1 and by constituting the second planetary gear set GS2 due to engagement of the H&LR clutch C3, increasing the speed of input rotation from the input shaft "Input" to output the rotation at the increased speed via the output gear "Output".

With regard to torque flow at the seventh speed, torque acts on the input clutch C1, the H&LR clutch C3, the front brake B1, the first connection member M1, the second connection member M2, and the third connection member M3. In short, the first planetary gear set GS1 and the second planetary gear set GS2 participate in the torque transmission.

Reverse Speed

As shown in FIG. 2, the reverse speed is established by engaging the H&LR clutch C3, the front brake B1, and the reverse brake B4.

At the reverse speed, because the front brake B1 is engaged, the first planetary gear set GS1 reduces the speed of the rotation and outputs the rotation at the reduced speed via the first connection member M1 to the fourth ring gear R4. In addition, because the H&LR clutch C3 is engaged and the reverse brake B4 is engaged, the second planetary gear set GS2 outputs via the third carrier PC3 a rotation prescribed by the rotation of the fourth ring gear R4 and by fixing the second connection member M2.

In other words, as shown in FIG. 3, the reverse speed is prescribed by a line linking a point, which is determined by reducing the speed of output rotation of the engine by the first planetary gear set GS1 due to engagement of the front brake B1, and a point, which is determined by fixing the output rotation of the second connection member M2 due to engagement of the reverse brake B4 and by constituting the second planetary gear set GS2 due to engagement of the H&LR clutch C3, reversing the direction of and reducing the speed of input rotation from the input shaft "Input" to output the reversed and reduced rotation via the output gear "Output".

With regard to torque flow at the reverse speed, torque acts on the H&LR clutch C3, the front brake B1, the reverse brake B4, the first connection member M1, the second connection member M2, and the third connection member M3. In short, the first planetary gear set GS1 and the second planetary gear set GS2 participate in the torque transmission.

Processing to Detect Transmission Failure

Figure 4:
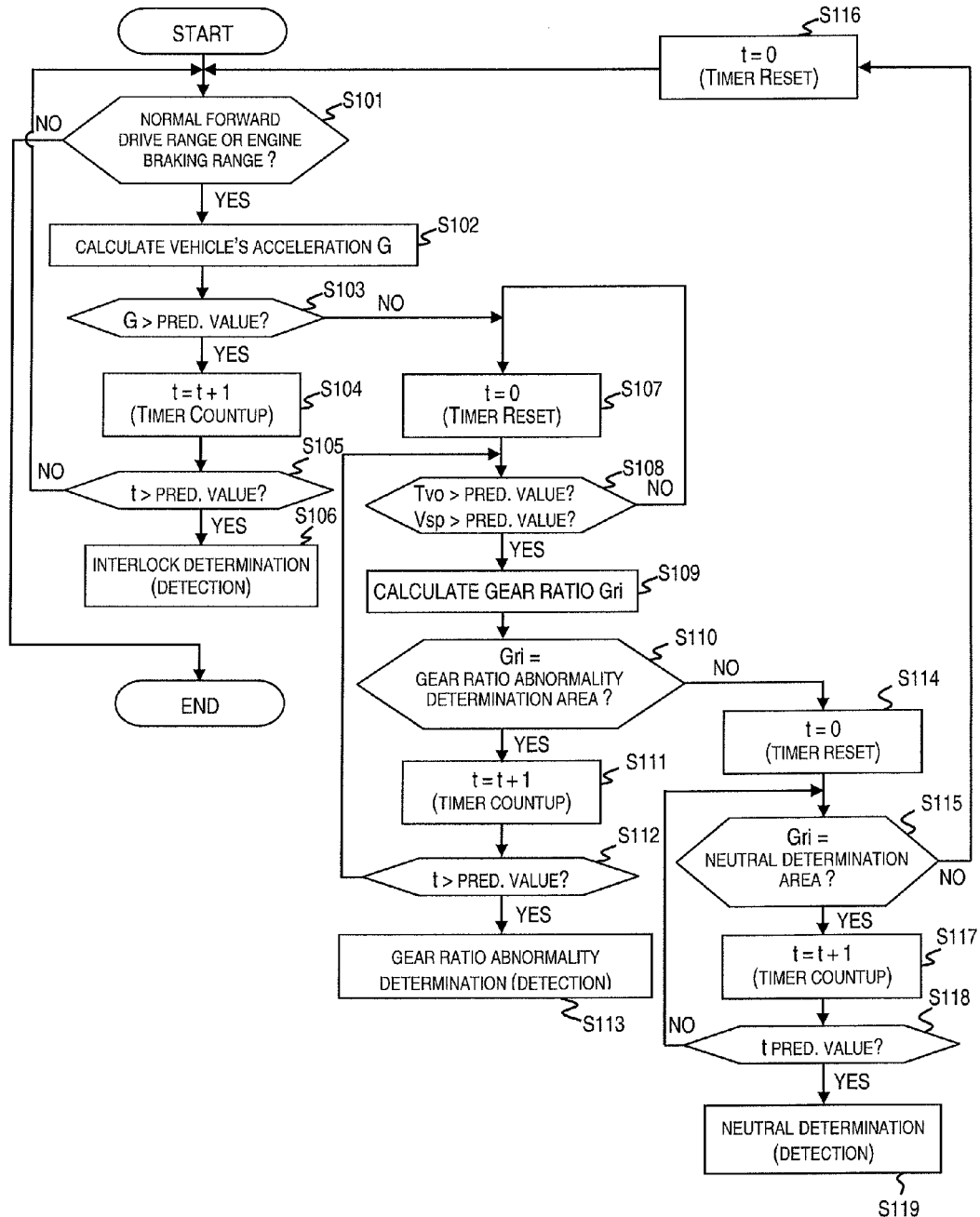
FIG. 4 is a flow chart showing a flow of processing to detect transmission failure, which is executed by an ATCU 20 of the first embodiment.

FIG. 4 is a flow chart constitutes a neutral determination section that is representative of a plurality of computer program instructions executed, at every predetermined control cycle, by the ATCU 20 in carrying out the processing to detect transmission failure (i.e., an interlock determination, a gear ratio abnormally determination, and a neutral determination).

At step S101, determination is made whether or not the inhibitor switch signal indicates the normal forward drive range or the engine braking range to let the present control flow go to step S102 upon making determination that the inhibitor switch signal indicates the normal forward drive range or the engine braking range or come to an end upon making the other determination.

At step S102, following the determination at step S101 that the current range is the normal drive range or the engine braking range, calculation is made to determine the vehicle's acceleration G before shifting to step S103. Here, this calculation of the vehicle's acceleration G is made based on sensor signal of a longitudinal-acceleration sensor mounted to the vehicle, for example.

At step S103, following the calculation of the vehicle's acceleration G at step S102, determination is made whether or not the vehicle's acceleration G is less than a predetermined value to let the present control flow go to step S104 upon making determination that it is less than the predetermined value or to step S107 upon making the other determination. In other words, there occurs detection of a rapid drop in the vehicle's acceleration, which would occur in case of failure to present interlock state.

At step S104, following the determination at step S103 that the vehicle's acceleration G is less than the predetermined value, count-up of a timer "t" is executed (t=t+1) before shifting to step S105.

At step S105, following the timer count-up at step S104, determination is made whether or not a count value of the timer "t" is greater than a predetermined value to let the present control flow go to step S106 upon making determination that it is greater than the predetermined value or to step S101 upon making the other determination. In other words, it is determined that the automatic transmission fails upon determination that the count value of the timer "t" is greater than the predetermined value because there is continuous occurrence of the state satisfying the above-mentioned condition. On the other hand, there is removed the case the state satisfying the above-mentioned condition occurs temporarily due to the influence of noise or the like.

At step S106, following the determination at step S105 that the count value of the timer "t" is greater than the predetermined value, determination is made that the automatic transmission fails, thus presenting interlock state.

At step S107, following the determination at step S103 that the vehicle's acceleration G is not less than the predetermined value (G≧the predetermined value), the timer "t" is reset to 0 before shifting to step S108.

At step S108, following resetting, at step S107, of the timer "t", determination is made whether or not the throttle opening degree Tvo exceeds a predetermined value and the vehicle's speed Vsp exceeds a predetermined value to let the present control flow go to step S109 upon making determination that it is the case (YES) or to step S107 upon making determination that it is not the case (NO). What is done at this determination step S108 is to determine whether or not the vehicle is moving by making determination whether or not both the throttle opening degree Tvo and the vehicle's speed Vsp exceed the respective predetermined values. In other words, processing after step S109 is not carried out upon making determination with NO because the vehicle is stopping.

At step S109, following the determination at step S108 that Tvo>(the predetermined value) and Vsp>(the predetermined value), a gear ratio Gr is calculated based on an output shaft speed given by the output shaft speed sensor 5 and an input shaft speed that is calculated from the first turbine speed sensor 3 and the second turbine speed sensor 4 before shifting to step S100. Thus, step S109 constitutes a gear ratio detection section.

Figure 5:
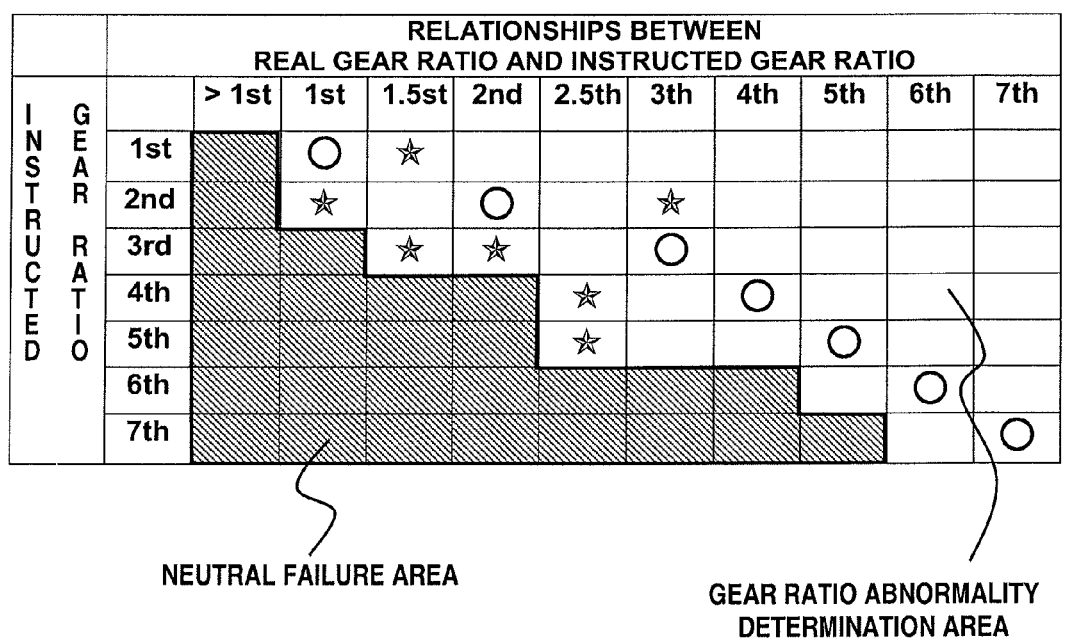
FIG. 5 is a view showing the relationship, between gear ratios instructed and real gear ratios, which is used for determination executed by processing to detect transmission failure.

At step S110, following the calculation of the gear ratio Gr, determination is made whether or not the gear ratio Gr falls in a gear ratio abnormally determination area shown by FIG. 5 to let the present control flow go to step S111 upon making determination that it falls in the gear ratio abnormally determination area or to step S114 upon making the other determination.

At step S111, following the determination at step S110 that the gear ratio Gr falls in the gear ratio abnormally determination area), count-up of the timer "t" is executed (t=t+1) before shifting to step S112.

At step S112, following the timer count-up, at step S111, determination is made whether or not a count value of the timer "t" is greater than a predetermined value to let the present control flow go to step S113 upon making determination that it is greater than the predetermined value or to step S108 upon making the other determination. In addition, further description is hereby omitted because the reason why this continuity over the predetermined timer count value is needed is the same as step S105.

At step S113, following the determination at step S112 that the timer count value is greater than the predetermined value, determination is made that the gear ratio Gr is abnormal.

At step S114, following the determination at step S110 that the gear ratio Gr falls outside the gear ratio abnormally determination area shown in FIG. 5, the timer "t" is reset to 0 before shifting to step S115.

At step S115, following the timer reset at step S114, determination is made whether or not the gear ratio Gr falls in the area with slanted lines shown in FIG. 5, which area represents that the automatic transmission fails, thus presenting neutral state, to let the present control flow shift to step S117 upon determination that the gear ratio Gr falls in the area with slanted lines or to step S116 upon the other determination.

At step S116, following the determination at step S115 that the gear ratio Gr falls in the area with slanted lines shown in FIG. 5 which represents that the automatic transmission fails, thus presenting neutral state, the timer "t" is reset to 0 before returning to step S101.

At step S117, following the determination at step S115 that the gear ratio Gr falls in the area with slanted lines shown in FIG. 5, which represents that the automatic transmission fails, thus presenting neutral state, count-up of the timer "t" is executed (t=t+1) before shifting to step S118.

At step S118, following the timer count-up, at step S117, determination is made whether or not a count value of the timer "t" is greater than a predetermined value to let the present control flow go to step S119 upon making determination that it is greater than the predetermined value or to step S115 upon making the other determination. In addition, further description is hereby omitted because the reason why this continuity over the predetermined timer count value is needed is the same as step S105.

At step S119, following the determination at step S112 that the count value of the timer "t" is greater than the predetermined value, determination is made that the automatic transmission fails, thus presenting neutral state.

Neutral Control Processing

Figure 6:
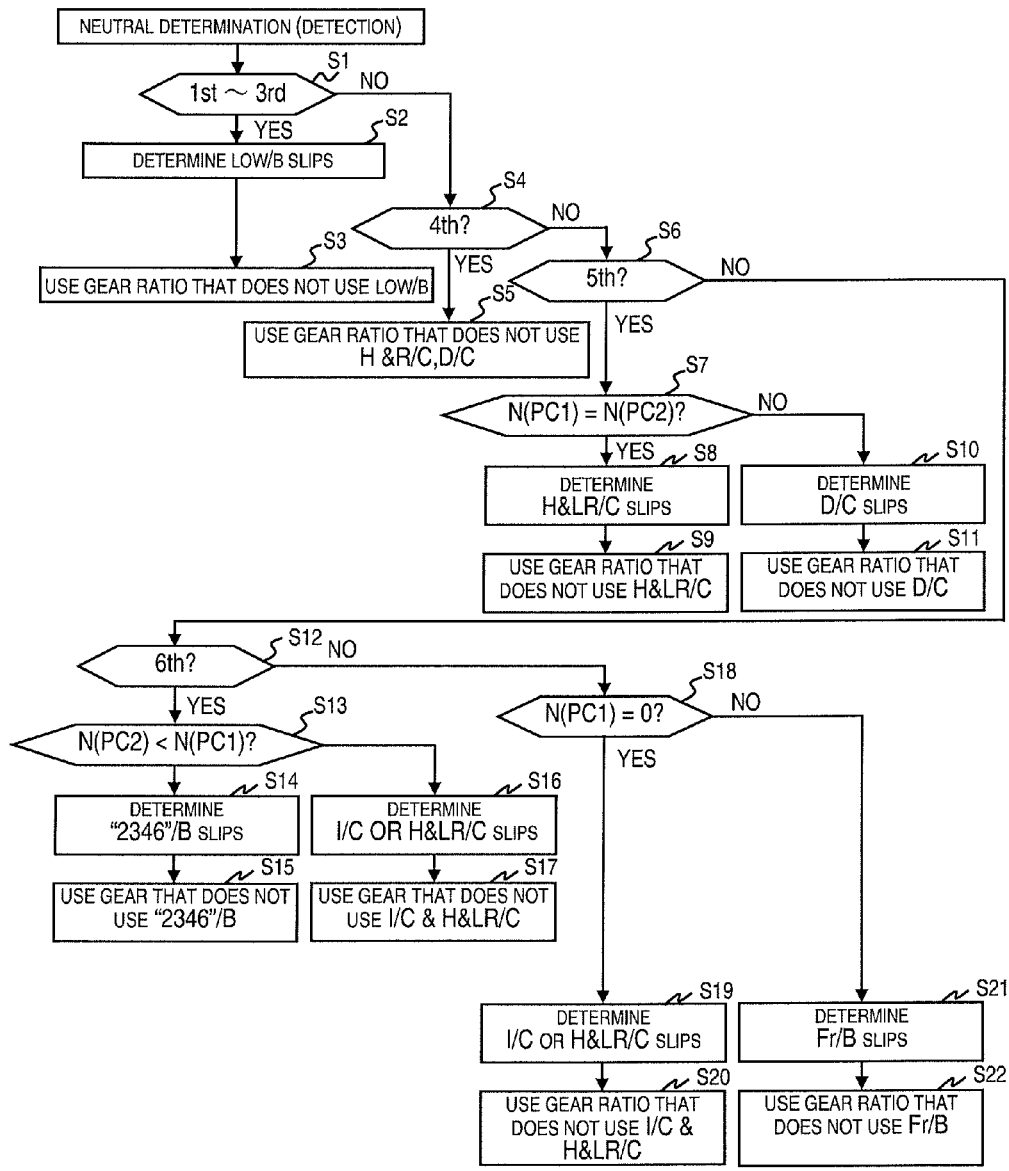
FIG. 6 is a flow chart shown a flow of a neutral control processing executed when, at step S119 of the flow chart of FIG. 4, determination is made that the automatic transmission fails and presents a neutral state.

FIG. 6 is a flow chart showing the routine for a neutral control processing executed upon the determination at step S119 that the automatic transmission fails, and thus, presenting neutral state. Accordingly, the flow chart of FIG. 6 constitutes a neutral control section.

At step S1, a determination is made whether or not an instructed gear ratio is the first or second or third speed to let the present control flow shift to step S2 upon determination that this is the case (YES) or to step S4 upon the other determination that this is not the case (NO).

At step S2, following the determination at step S1 that the instructed gear ratio is the first or second or third speed, determination is made that disengagement by mistake of the low brake B2 causes the determination that the automatic transmission fails, thus presenting neutral state, and the present control flow shifts to step S3.

At step S3, following the determination at step S2 that the low brake B2 is disengaged by mistake, among the gear ratios (the fourth speed~the seventh speed) which do not use engagement of the low brake B2, one of them is determined depending on the vehicle's speed at the time of determination that the automatic transmission fails, thus presenting neutral state, as a target gear ratio to be accomplished after gear shifting.

At step S4, following the determination at step S1 that the instructed gear ratio is not any one of the first, second and third speed, determination is made whether or not the instructed gear ratio is the fourth speed to let the present control flow shift to step S5 upon determination that this is the case (YES) or to step S6 upon the other determination that this is not the case (NO).

At step S5, following the determination at step S4 that the instructed gear ratio is the fourth speed, among the gear ratios (the first speed and the second speed) which does not use engagement of the H&LR clutch C3 and engagement of the direct clutch C2, one of them is determined depending on the vehicle's speed at the time of determination that the automatic transmission fails, thus presenting neutral state, as a target gear ratio to be accomplished after gear shifting, based on determination that disengagement by mistake of the H&LR clutch C3 or disengagement by mistake of the direct clutch C2 causes the determination that the automatic transmission fails, thus presenting neutral state.

At step S6, following the determination at step S4 that the instructed gear ratio is not the fourth speed, determination is made whether or not the instructed gear ratio is the fifth speed to let the present control flow shift to step S7 upon determination that this is the case (YES) or to step S12 upon determination that this is not the case (NO).

At step S7, following the determination at step S4 that the instructed gear ratio is the fifth speed, determination is made whether or not the speed relationship between the speed N(PC1) of the first carrier PC1 and the speed N(PC2) of the second carrier N(PC2) is N(PC1)=N(PC2) to let the present control flow shift to step S8 upon determination that this is the case (YES) or to step S10 upon the other determination that this is not the case (NO).

At step S8, following the determination at step S7 that N(PC1)=N(PC2), determination is made that disengagement by mistake of the H&LR clutch C3 causes the determination that the automatic transmission fails, thus presenting neutral state, before shifting to step S9.

At step S9, following the determination at step S8 that the H&LR clutch C3 is disengaged by mistake, among the gear ratios (the first speed, the second speed, and the third speed) which do not use engagement of the H&LR clutch C3, one of them is determined depending on the vehicle's speed at the time of determination that the automatic transmission fails, thus presenting neutral state, as a target gear ratio to be accomplished after gear shifting.

At step S10, following the determination at step S7 that N(PC1)≠N(PC2), determination is made that disengagement by mistake of the direct clutch C2 causes the determination that the automatic transmission fails, thus presenting neutral state, before shifting to step S11.

At step S11, following the determination at step S10 that the direct clutch C2 is disengaged by mistake, among the gear ratios (the first speed, the second speed, the sixth speed, and the seventh speed) which do not use engagement of the direct clutch C2, one of them is determined depending on the vehicle's speed at the time of determination that the automatic transmission fails, thus presenting neutral state, as a target gear ratio to be accomplished after gear shifting.

At step S12, following the determination at step S6 that the instructed gear ratio is not the fifth speed, determination is made whether or not the instructed gear ratio is the sixth speed to let the present control flow shift to step S13 upon determination that this is the case (YES) or to step S18 upon the other determination that this is not the case (NO).

At step S13, following the determination at step S12 that the instructed gear ratio is the sixth speed, determination is made whether or not the speed relationship between the speed N(PC1) of the first carrier PC1 and the speed N(PC2) of the second carrier N(PC2) is N(PC1)<N(PC2) to let the present control flow shift to step S14 upon determination that this is the case (YES) or to step S16 upon the other determination that this is not the case (NO).

At step S14, following the determination at step S13 that N(PC1)<N(PC2), determination is made that disengagement by mistake of the "2346" brake B3 causes the determination that the automatic transmission fails, thus presenting neutral state, before shifting to step S15.

At step S15, following the determination at step S14 that the "2346" brake B3 is disengaged by mistake, among the gear ratios (the first speed, the fifth speed, and the seventh speed) which do not use engagement of the "2346" brake B3, one of them is determined depending on the vehicle's speed at the time of determination that the automatic transmission fails, thus presenting neutral state, as a target gear ratio to be accomplished after gear shifting.

At step S16, following the determination at step S13 that N(PC2)≧N(PC1), determination is made that disengagement by mistake of the input clutch C1 or disengagement by mistake of the H&LR causes the determination that the automatic transmission fails, thus presenting neutral state, before shifting to step S17.

At step S17, following the determination at step S16 that the input clutch C1 is disengaged by mistake or the H&LR clutch C3, among the gear ratios (the first speed, the second speed, and the third speed) which do not use engagement of the input clutch C1 and engagement of the H&LR clutch C3, one of them is determined depending on the vehicle's speed at the time of determination that the automatic transmission fails, thus presenting neutral state, as a target gear ratio to be accomplished after gear shifting.

At step S18, following the determination at step S12 that the instructed gear ratio is not the sixth speed, but the seventh speed, determination is made whether or not the speed N(PC1) of the first carrier PC1 is zero, N(PC1)=0 to let the present control flow shift to step S19 upon determination that this is the case (YES) or to step S21 upon determination that this is not the case (NO).

At step S19, following the determination at step S13 that N(PC1)=0, determination is made that disengagement by mistake of the input clutch C1 or disengagement by mistake of the H&LR clutch C3 causes the determination that the automatic transmission fails, thus presenting neutral state, before shifting to step S20.

At step S20, following the determination that the input clutch C1 is disengaged by mistake or the H&LR clutch C3 is disengaged by mistake, among the gear ratios (the first speed, the second speed, and the third speed) which do not use engagement of the input clutch C1 and engagement of the H&LR clutch C3, one of them is determined depending on the vehicle's speed at the time of determination that the automatic transmission fails, thus presenting neutral state, as a target gear ratio to be accomplished after gear shifting.

At step S21, following the determination at step S18 that N(PC1)≠0, determination is made that disengagement by mistake of the front brake B1 causes the determination that the automatic transmission fails, thus presenting neutral state, before shifting to step S22.

At step S22, following the determination at step S21 that front brake B1 is disengaged by mistake, among the gear ratios (the second speed~the sixth speed) which do not use engagement of the front brake B1, one of them is determined depending on the vehicle's speed at the time of determination that the automatic transmission fails, thus presenting neutral state, as a target gear ratio to be accomplished after gear shifting.

Next, the operation of the control apparatus will be discussed. At first, in the case of an automatic transmission, in order to detect a speed of a rotation of an input shaft of the transmission (i.e., equal to a speed of a rotation of the turbine shaft), information regarding the input shaft speed may be obtained via a rotary-speed sensor without posing any problem if a turbine shaft is not covered by any rotary member so that a rotary-speed sensor can directly detect a speed of a rotation of the turbine shaft. However, in late years, multistage of an automatic transmissions advances and constitution of a gear train becomes complicated with the multistage, so that there is increasing possibility that a speed of a rotation of an input shaft of the transmission may not be directly detected by a rotary-speed sensor. In the case a speed of a transmission input shaft is not directly detected, there is a problem that even if an attempt is made to perform various kinds of control requiring gear ratio information as necessary information using an input shaft speed information and a gear ratio information using the input shaft speed information, high precision control cannot be expected.

In contrast, the first embodiment of the control apparatus for an automatic transmission makes it possible to securely detect the input shaft speed even if structure of an automatic transmission becomes complicated with the multistage. In other words, paying attention to the fact that the input shaft "Input" is connected to the second ring gear R2 and, furthermore, the first planetary gear G1 and the second planetary gear G2 constitute the first planetary gear set GS1 with two rotary elements of one planetary gear connected to two rotary elements of the other planetary gear, the speed calculation section within the ATCU 20 detects the input shaft "Input" speed by calculation using the two turbine speed sensors 3 and 4.

In particular, the input shaft "Input" speed is given by a speed of a rotation N(R2) of the second ring gear R2 that may be expressed by the following formula:

$$N(R2)=(1+1/\beta)-(1/\beta) \cdot N(PC1)$$

where:
N(PC1) is a speed of a rotation of the first carrier PC1;
N(PC2) is a speed of a rotation of the second carrier PC2;
N(R2) is a speed of a rotation of the second ring gear R2;
a gear ratio between the second ring gear R2 and the second carrier PC2 (the first ring gear R1) is assumed to be 1; and
a gear ratio between the first ring gear R1 (the second carrier PC2) and the first carrier PC1 is assumed to be β as shown in a lever diagram of FIG. 3.

Therefore, it is possible to find the input shaft speed by calculation based on relationship between the speeds of the second and first carriers PC2 and PC1 which are detectable, even if constitution of a gear train becomes complicated with the multistage of an automatic transmission and, for example, a rotary member covers the turbine shaft, so that the input shaft speed of the transmission may not be directly detected by a rotary-speed sensor.

Conventional technology of forcing an automatic transmission is disclosed in Japanese Laid Open Patent Publication. No. A 2000-240785. In this conventional technology, the automatic transmission has a turbine speed sensor S3 to detect the speed of rotation of a turbine shaft 11, to shift to a safe (non-malfunction) gear ratio after determining the portion which fails when the automatic transmission fails. This conventional technology teaches calculating a real gear ratio r out of a turbine speed ω1 detected by the turbine speed sensor S3 and an output speed ω5 detected by an output speed sensor S4 and determining that the automatic transmission fails when the real gear ratio r continues to differ from a gear ratio Ri of an instructed gear ratio for a predetermined time τ. Next, it determines the portion which fails by comparing the real gear ratio r to a gear ratio Ri of each of instructed gear ratios upon determination that the automatic transmission fails. And, it possesses a map set beforehand depending on the current instructed gear ratio and the portion which fails, forcing the automatic transmission to shift to a predetermined gear ratio.

However, if the automatic transmission fails and presents a neutral state due to disengagement by mistake of a frictionally engaging element, comparing the real gear ratio r to the gear ratio Ri of each of the instructed gear ratios makes it impossible to determine the frictionally engaging element which causes the automatic transmission to fail. This is because the real gear ratio r, which appears when the automatic transmission fails, always changes depending on engine speed (that changes depending on accelerator opening degree). A rise or a fall in engine speed causes a rise (or a fall) in turbine speed ωl, causing, as a result, a rise or a fall in real gear ratio r. Therefore, it is not possible to set the threshold for the real gear ratio r, which always changes depending on engine speed, and it is not possible to determine the portion which fails when the automatic transmission fails and presents a neutral state, making it possible to output only a fail signal indicating that the automatic transmission fails and presents a neutral state. Therefore, the automatic transmission cannot shift to a safe (non-malfunction) gear ratio even though it is kept in neutral, making it impossible to conduct a fail control that secures a shift to the safe (non-malfunction) gear ratio, when the automatic transmission fails and presents a neutral state due to disengagement by mistake of a frictionally engaging element because it is not possible to determine the frictionally engaging element which malfunctions (fails or is disengaged by mistake).

In contrast, the first embodiment of a control apparatus for an automatic transmission can secure the freedom of selecting gear ratios, which the automatic transmission is allowed to shift to, when the automatic transmission fails and presents a neutral state by determining the frictionally engaging element which is disengaged by mistake and the associated actuator member. In other words, paying attention to points that the automatic transmission comprises the turbine rotary-speed sensors 3 and 4 arranged to detect the speed N(PC1) of rotation of the first carrier PC1 and the speed N(PC2) of rotation of the second carrier PC2, in addition to determination that the automatic transmission fails and presents a neutral state due to disengagement by mistake of a frictionally engaging element as a result of comparison of the gear ratio, the frictionally engaging element that is disengaged by mistake or the actuator member (such as, electrically operated valve or the like) which drives the frictionally engaging element is determined based on relationship between a selected gear ratio that may specify engaged frictionally engaging elements and the speeds N(PC1) and N(PC2) of rotations detected by both of the turbine rotary-speed sensors 3 and 4.

Therefore, a neutral control is conducted by forcing the automatic transmission to shift to a safe (non-malfunction) gear ratio upon determining that the automatic transmission fails and presents the neutral state even if the shift control section gives instructions so that the automatic transmission may establish a drivable gear ratio. The neutral control determines the frictionally engaging element which is disengaged by mistake and that associated actuator member which activates the frictionally engaging element based on a selected gear ratio, which determines engaged frictionally engaging elements, and a relationship between the speeds N(PC1) and N(PC2) detected by both of the turbine rotary-speed sensors 3 and 4. In other words, only comparing a real gear ratio to a the instructed gear ratio does not make more than determination whether or not the automatic transmission fails and presents a neutral state, but adding the relationship between speeds N(PC1) and N(PC2) from both of the turbine rotary-speed sensors 3 and 4 makes it possible to determine the frictionally engaging element which is disengaged by mistake out of the plurality of frictionally engaging elements and the associated actuator member which activates the determined frictionally engaging element when the relationship between the speeds N(PC1) and N(PC2) from both of the turbine rotary-speed sensors 3 and 4 changes owing to outbreak of slip in the determined frictionally engaging element. This is because the relationship between the two speeds N(PC1) and N(PC2) provided by the both turbine rotary-speed sensors 3 and 4 is invariable without depending on engine speed. And, determining the frictionally engaging element which is disengaged by mistake makes it possible to force the automatic transmission to shift to other gear ratio that does not use the determined frictionally engaging element.

The following is a description of the operation to detect transmission failure based on an interlock determination, a gear ratio abnormally determination and a neutral determination, and the operation to conduct a neutral control at the time of a neutral fail, which are carried out by the first embodiment of a control apparatus for an automatic transmission.

Referring to the flow chart shown in FIG. 4, normally, when the automatic transmission does not fail and does not present any interlock or any gear ratio abnormally or any neutral during driving the vehicle in the normal forward drive range (D range) or the engine braking range, a flow along step S101→step→S102→step S103→step S107→step S108→step S1009→step S110→step S114→step S115→step S116 is repeated. In this abnormally, in the TCU 20, the normal shift control is conducted by selecting an optimum instructed gear ratio out of the 7-speed forward shift scheduling map, which is out of the drawings, based on the vehicle's speed Vsp and the accelerator pedal opening APO and by issuing to the control valve unit CVU a control order that a certain shift should occur to accomplish the instructed gear ratio.

Operation to Determine Interlock

When the automatic transmission fails and presents an interlock state because a frictionally engaging element sticks, the vehicle's acceleration falls rapidly to satisfy the acceleration condition described at step S103, repeating, referring to the flow chart shown in FIG. 4, a flow along step S101→step S102→step S103→step S104→step S105. Subsequently, when, at step S105, a count value of the timer "t" exceeds the predetermined value after the state that the acceleration condition at step S103 has continued, the present control flow advances from step S105 to step S106 at which determination is made that the automatic transmission fails and presents an interlock. And, upon making determination at step S106 that the automatic transmission fails and presents the interlock, as a fail-safe processing of the shift control, for example, the frictionally engaging element which adheres is specified, and, if there is one and a single gear ratio that is accomplished using the engaged specified frictionally engaging element, there is issued a shift order that a shift should occur to accomplish this gear ratio, but if there are a plurality of gear ratios that are accomplished using the engaged specified frictionally engaging element, there is issued a shift order that a shift should occur to an optimum gear ratio selected out of the plurality of gear ratios depending on the vehicle's speed and the like.

Operation to Determine Abnormally in Gear Ratio

When the automatic transmission fails and presents an abnormally in gear ratio during driving the vehicle because a frictionally engaging element is engaged by mistake, the gear ratio falls into the abnormally determination area outside the normally determination area to satisfy the gear ratio abnormally determination condition described at step S110, repeating, referring to the flow chart shown in FIG. 4, a flow along step S101→step S102→step S103→step S107→step S108→step S109→step S110→step S111→step S112. Subsequently, when, at step S112, a count value of the timer "t" exceeds the predetermined value after the state that the gear ratio abnormally determination condition at step S110 has continued, the present control flow advances from step S112 to step S113 at which determination is made that the automatic transmission fails and presents the abnormally in gear ratio. And, upon making determination at step S113 that the automatic transmission fails and presents the abnormally in gear ratio, as a fail-safe processing of the shift control, for example, the frictionally engaging element which is engaged by mistake and causes the abnormally in gear ratio is specified if possible, and there is issued a shift order that a shift should occur to a certain gear ratio that prevents the automatic transmission from failing and presenting an input shaft interlock state or an output shaft neutral state.

Operation to Determine Neutral (Failure) State

When the automatic transmission fails and presents a neutral state during driving the vehicle because a frictionally engaging element is disengaged by mistake, the gear ratio falls into the neutral failure determination area outside the normally determination area to satisfy the neutral failure determination condition described at step S115, repeating, referring to the flow chart shown in FIG. 4, a flow along step S101→step S102→step S103→step S107→step S108→step S109→step S110→step S114→step S115→S117→S118. Subsequently, when, at step S118, a count value of the timer "t" exceeds the predetermined value after the state that the neutral failure determination condition at step S115 has continued, the present control flow advances from step S118 to step S119 at which determination is made that the automatic transmission fails due to disengaged by mistake of a frictionally engaging element and presents the neutral state. And, upon making determination at step S119 that the automatic transmission fails and presents the neutral state, as a fail-safe processing of the shift control, the neutral control, which will be described below in detail, is conducted.

Operation to Conduct Neutral Control upon Neutral Failure

When Instructed Gear Ratio is one of the First~Third Speeds

When the instructed gear ratio is the first or second or third speed upon determination that the automatic transmission fails and presents a neutral state (at the time of neutral failure), referring to the flow chart shown in FIG. 6, the present control flows along step S1→step S2→step S3. It is determined at step S2 that disengagement by mistake of the low brake B2 causes the determination that the automatic transmission fails and presents the neutral state, and, among the gear ratios (the fourth~the seventh speeds) that do not use the low brake B2, a gear ratio to be accomplished after a shift is determined at step S3 depending on the vehicle's speed at the time when determination is made that the automatic transmission fails and presents the neutral state.

In other words, when a frictionally engaging element other than the low brake B2 is disengaged by mistake during driving the vehicle with the first or second or third speed, the first or second speed is established as a gear ratio (see FIG. 2). Thus, there occurs a shift to a gear ratio that does not use the low brake B2 because only the case that the low brake B2 is disengaged by mistake causes determination that the automatic transmission fails and presents a neutral state during driving with the first or second or third speed.

When Instructed Gear Ratio is the Fourth Speed

When the instructed gear ratio is the fourth speed upon determination that the automatic transmission fails and presents a neutral state (at the time of neutral failure), referring to the flow chart shown in FIG. 6, the present control flows along step S1→step S4→step S5. Based on determination that disengagement by mistake of the H&LR clutch C3 or disengagement by mistake of the direct clutch C2 causes the determination that the automatic transmission fails and presents the neutral state, among the gear ratios (the first and second speeds) that do not use the H&LR clutch C3 and the direct clutch C2, a gear ratio to be accomplished after a shift is determined at step S5 depending on the vehicle's speed at the time when determination is made that the automatic transmission fails and presents the neutral state.

Figure 7:
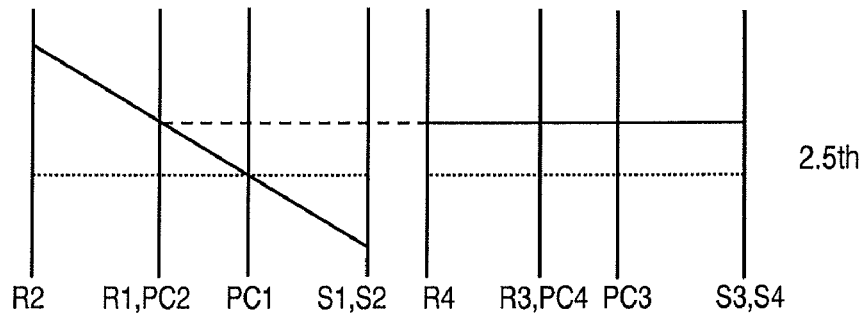
FIG. 7 are lever diagrams, each showing a rotary-speed relationship in each of the cases of disengagement by mistake of a "2346" brake B3, that of a H&LR clutch C3, and that of a direct clutch C2 when the instructed gear ratio is the fourth speed.
Figure 7:
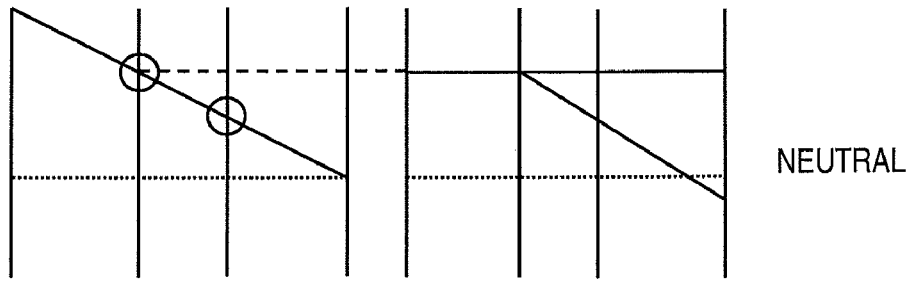
Figure 7:
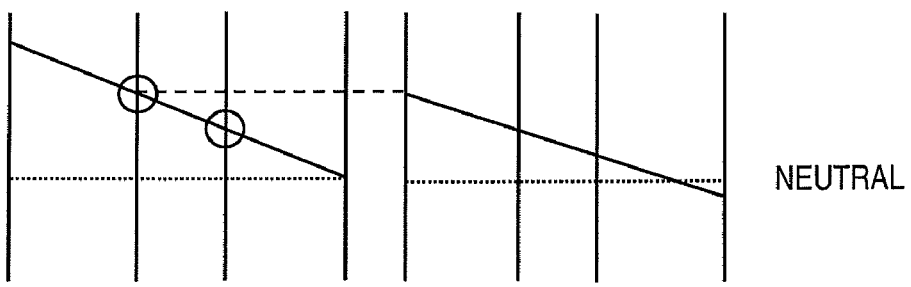

In other words, during driving the vehicle with the fourth speed, disengagement by mistake of the H&LR clutch C3 and disengagement by mistake of the direct clutch C2 show the same speed relationship, between the speed N(PC1) of the first carrier PC1 and the speed N(PC2) of the second carrier PC2, that N(PC1)<N(PC2) as shown in diagrams (b) and (c) of FIG. 7 so that it is impossible to tell which one of the two clutches C3 and C2 is disengaged by mistake to establish the neutral state. On the other hand, with the fourth speed, disengagement by mistake of the "2346" brake B3 causes establishment of the $2.5^{th}$ speed as shown in diagram (a) of FIG. 7. Therefore, when the automatic transmission fails and presents the neutral state (at the time of neutral failure) during driving the vehicle with the instructed gear ratio being the fourth speed, a shift occurs to a gear ratio that does not use the H&LR clutch C3 and the direct clutch C2.

When Instructed Gear Ratio is the Fifth Speed

When the instructed gear ratio is the fifth speed upon determination that the automatic transmission fails and presents a neutral state (at the time of neutral failure) and N(PC1)=N(PC2), referring to the flow chart shown in FIG. 6, the present control flows along step S1→step S4→step S6→step S7→step S8→step S9. At step S8, following the determination at step S7 that N(PC1)=N(PC2), determination is made that disengagement by mistake of the H&LR clutch C3 causes the determination that the automatic transmission fails and presents the neutral state. Among the gear ratios (the first, second and third speeds) that do not use the H&LR clutch C3, a gear ratio to be accomplished after a shift is determined at step S9 depending on the vehicle's speed at the time when determination is made that the automatic transmission fails and presents the neutral state.

When the instructed gear ratio is the fifth speed upon determination that the automatic transmission fails and presents a neutral state (at the time of neutral failure) and N(PC1)≠N(PC2), referring to the flow chart shown in FIG. 6, the present control flows along step S1→step S4→step S6→step S7→step S10→step S11. At step S10, following the determination at step S7 that N(PC1)≠N(PC2), determination is made that disengagement by mistake of the direct clutch C2 causes the determination that the automatic transmission fails and presents the neutral state. Among the gear ratios (the first, second, sixth, and seventh speeds) that do not use the direct clutch C2, a gear ratio to be accomplished after a shift is determined at step S11 depending on the vehicle's speed at the time when determination is made that the automatic transmission fails and presents the neutral state.

Figure 8:
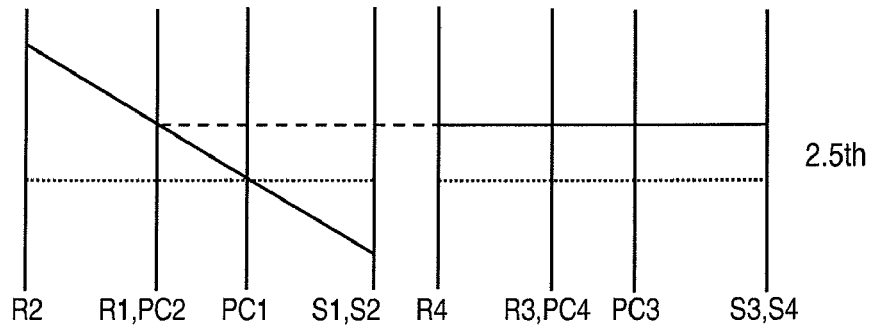
FIG. 8 are lever diagrams, each showing a rotary-speed relationship in each of the cases of disengagement by mistake of an input clutch C1, that of the H&LR clutch C3, and that of the direct clutch C2 when the instructed gear ratio is the fifth speed.
Figure 8:
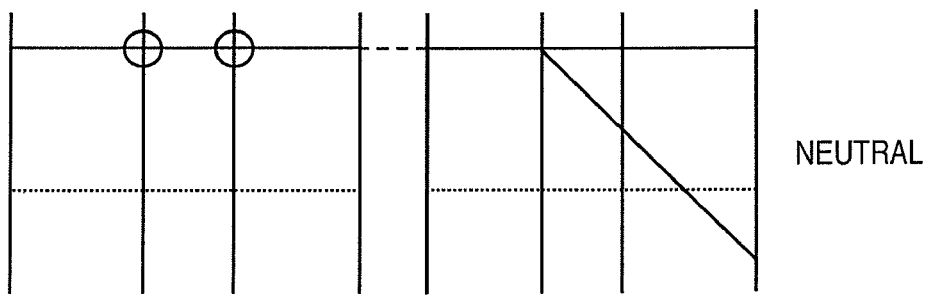
Figure 8:
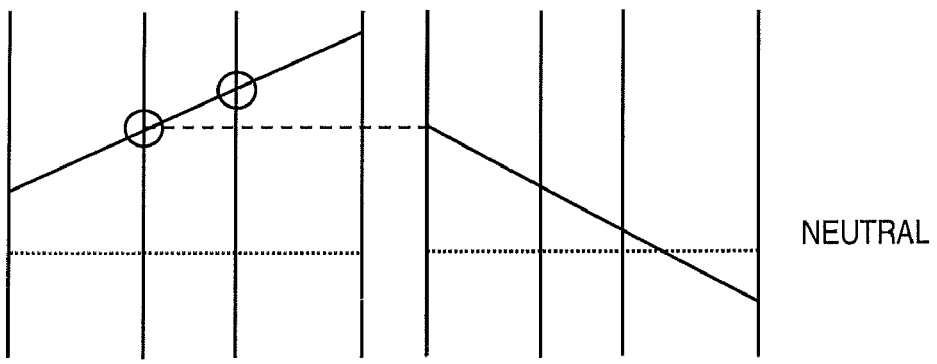

In other words, during driving the vehicle with the fifth speed, as shown in diagrams (b) and (c) of FIG. 8, determination can be made that the H&LR clutch C3 is disengaged by mistake when N(PC1)=N(PC2), and the direct clutch C2 is disengaged by mistake when N(PC1)≠N(PC2). On the other hand, with the fifth speed, disengagement by mistake of the input clutch C1 causes establishment of the $2.5^{th}$ speed as shown in diagram (a) of FIG. 8.

Therefore, when the automatic transmission fails and presents the neutral state (at the time of neutral failure) during driving the vehicle with the instructed gear ratio being the fifth speed and when N(PC1)=N(PC2), determination is made that the H&LR clutch C3 is disengaged by mistake, and a shift occurs to one of gear ratios (the first, second, and third speeds) that do not use the H&LR clutch C3. On the other hand, when the automatic transmission fails and presents the neutral state (at the time of neutral failure) during driving the vehicle with the instructed gear ratio being the fifth speed and when N(PC1)≠N(PC2), determination is made that the direct clutch C2 is disengaged by mistake, and a shift occurs to one of gear ratios (the first, second, sixth, and seventh speeds) that do not use the direct clutch C2.

When Instructed Gear Ratio is the Sixth Speed

When the instructed gear ratio is the sixth speed upon determination that the automatic transmission fails and presents a neutral state (at the time of neutral failure) and N(PC1)>N(PC2), referring to the flow chart shown in FIG. 6, the present control flows along step S1→step S4→step S6→step S12→step S13→step S14→step S15. At step S14, following the determination at step S13 that N(PC1)>N(PC2), determination is made that disengagement by mistake of the "2346" brake B3 causes the determination that the automatic transmission fails and presents the neutral state. Among the gear ratios (the first, fifth and seventh speeds) that do not use the "2346" brake B3, a gear ratio to be accomplished after a shift is determined at step S15 depending on the vehicle's speed at the time when determination is made that the automatic transmission fails and presents the neutral state.

When the instructed gear ratio is the sixth speed upon determination that the automatic transmission fails and presents a neutral state (at the time of neutral failure) and N(PC1)≦N(PC2), referring to the flow chart shown in FIG. 6, the present control flows along step S1→step S4→step S6→step S12→step S13→step S16→step S17. At step S16, following the determination at step S13 that N(PC1)≦N(PC2), determination is made that disengagement by mistake of the input clutch C1 or disengagement by mistake of the H&LR clutch C3 causes the determination that the automatic transmission fails and presents the neutral state. Among the gear ratios (the first, second, and third speeds) that do not use the input clutch C1 and H&LR clutch C3, a gear ratio to be accomplished after a shift is determined at step S17 depending on the vehicle's speed at the time when determination is made that the automatic transmission fails and presents the neutral state.

Figure 9:
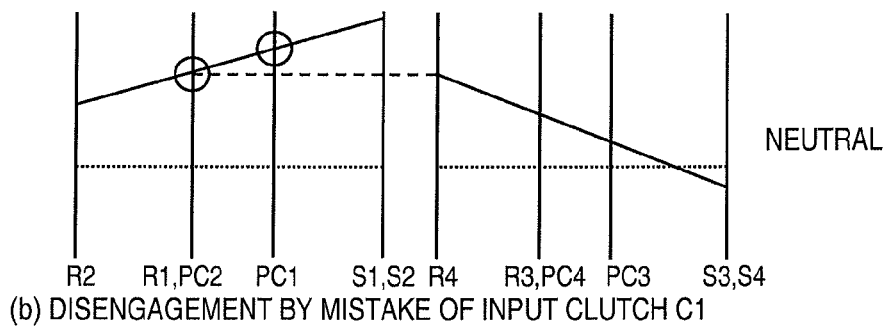
FIG. 9 are lever diagrams, each showing a rotary-speed relationship in each of the cases of disengagement by mistake of the "2346" brake B3, that of the input clutch C1, and that of the H&LR clutch C3 when the instructed gear ratio is the sixth speed.
Figure 9:
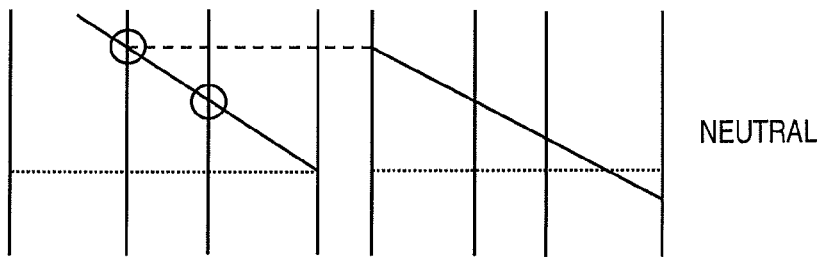
Figure 9:
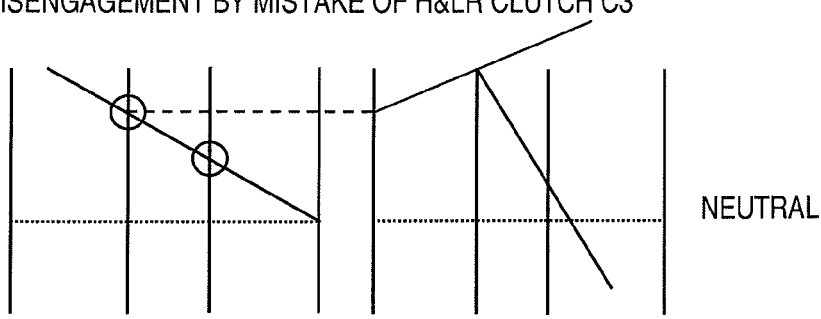

In other words, during driving the vehicle with the sixth speed, as shown in diagram (a) of FIG. 9, determination can be made that the "2346" brake B3 is disengaged by mistake when N(PC1)>N(PC2). On the other hand, with the sixth speed, determination can be made that disengagement by mistake of the input clutch C1 or disengagement by mistake of the H&LR clutch C3 causes the determination that the automatic transmission fails and presents the neutral state. When the instructed gear ratio is the sixth speed upon determination that the automatic transmission fails and presents the neutral state and N(PC1)>N(PC2), determination is made that the "2346" brake B3 is disengaged by mistake, and a shift occurs to accomplish one of gear ratios (the first speed, fifth, and seventh speeds) that do not use the "2346" brake B3. On the other hand, when the instructed gear ratio is the sixth speed upon determination that the automatic transmission fails and presents the neutral state and N(PC1)≦N(PC2), determination is made that the input clutch C1 is disengaged by mistake or the H&LR clutch C3 is disengaged by mistake, and a shift occurs to accomplish one of gear ratios (the first, second, and third speeds) that do not use the input clutch C1 and the H&LR clutch C3.

When Instructed Gear Ratio is the Seventh Speed

When the instructed gear ratio is the seventh speed upon determination that the automatic transmission fails and presents a neutral state (at the time of neutral failure) and N(PC1)= 0, referring to the flow chart shown in FIG. 6, the present control flows along step S1→step S4→step S6→step S12→step S18→step S19→step S20. At step S19, following the determination at step S18 that N(PC1)=0, determination is made that disengagement by mistake of the input clutch C or disengagement by mistake of the H&LR clutch C3 causes the determination that the automatic transmission fails and presents the neutral state. Among the gear ratios (the first, second, and third speeds) that do not use the input clutch C1 and the H&LR clutch C3, a gear ratio to be accomplished after a shift is determined at step S20 depending on the vehicle's speed at the time when determination is made that the automatic transmission fails and presents the neutral state.

On the other hands, when the instructed gear ratio is the seventh speed upon determination that the automatic transmission fails and presents a neutral state (at the time of neutral failure) and N(PC1)≠0, referring to the flow chart shown in FIG. 6, the present control flows along step S1→step S4→step S6→step S12→step S18→step S21→step S22. At step S21, following the determination at step S18 that N(PC1)≠ 0, determination is made that disengagement by mistake of the front brake B1 causes the determination that the automatic transmission fails and presents the neutral state. Among the gear ratios (the second~sixth speeds) that do not use the front brake B1, a gear ratio to be accomplished after a shift is determined at step S22 depending on the vehicle's speed at the time when determination is made that the automatic transmission fails and presents the neutral state.

Figure 10:
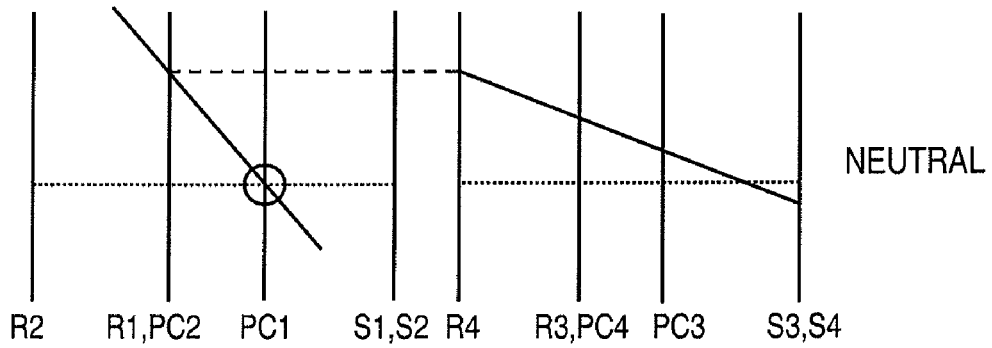
FIG. 10 are lever diagrams, each showing a rotary-speed relationship in each of the cases of disengagement by mistake of the input clutch C1, that of the H&LR clutch C3, and that of the front brake B1 when the instructed gear ratio is the seventh speed.
Figure 10:
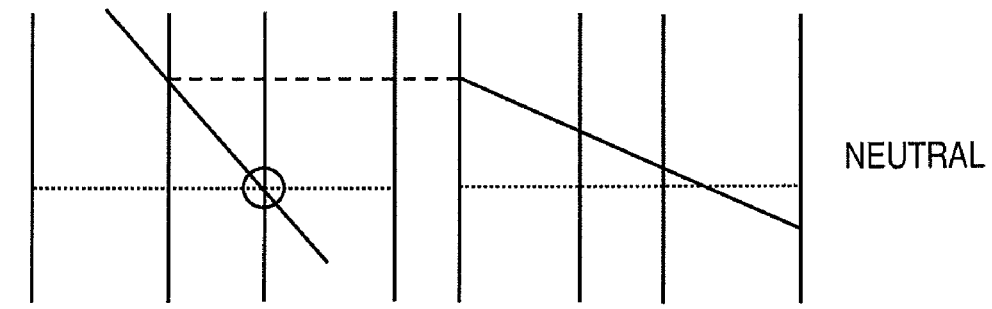
Figure 10:
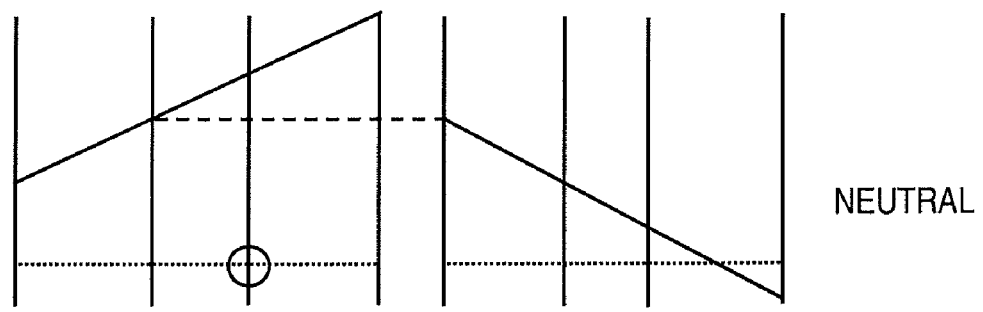

In other words, when, as shown in FIGS. 10(a) and 10(b), N(PC1)=0 during driving the vehicle with the seventh speed, determination can be made that the input clutch C1 is disengaged by mistake or the H&LR clutch is disengaged by mistake. On the other hand, when, as shown in FIG. 10(c), N(PC1)≠0 during driving the vehicle with the seventh speed, determination can be made that the front brake B1 is disengaged by mistake.

Therefore, when N(PC1)=0 upon determination that the automatic transmission fails and presents the neutral state during driving the vehicle with the instructed gear ratio being the seventh speed, determination is made that disengagement by mistake of the input clutch C1 or disengagement by mistake of the H&LR clutch C3 causes the determination that the automatic transmission fails and presents the neutral state, and a shift occurs to establish one of the gear ratios (the first, second, and third speeds) that do not use the input clutch C1 and the H&LR clutch C3. On the other hand, when N(PC1)≠0 upon determination that the automatic transmission fails and presents the neutral state during driving the vehicle with the instructed gear ratio being the seventh speed, determination is made that disengagement by mistake of the front brake B1 causes the determination that the automatic transmission fails and presents the neutral state, and a shift occurs to establish one of the gear ratios (the second sixth speeds) that do not use the front brake B1.

Setting of Gear Ratios upon Failing and Presenting Neutral

Referring to FIG. 6, at step S3, step S5, step S9, step S11, step S15, step S17, step S20, and step S22, a shift occurs to establish a gear ratio that does not use the frictionally engaging element which is disengaged by mistake. On that occasion, the gear ratio to be established after this shift is determined depending on the vehicle's speed at the time when determination is made that the automatic transmission fails and presents the neutral state. When, for example, the instructed gear ratio is the fifth speed and determination is made that the direct clutch C2 is disengaged by mistake, the gear ratios that may be established are the first, second, sixth, and seventh speeds. Then, if the vehicle's speed is high (for example, higher than or equal to 40 km/h), the setting is such that the gear ratio to be established is the sixth speed, or if the vehicle's speed is low (for example, lower than 40 km/h), the setting is such that the gear ratio to be established is the second speed. Subsequently, a shift should occur among the gear ratios that may be established depending on a state of the moving vehicle (represented by, for example, the vehicle's speed and/or accelerator opening degree). In addition, it may be equally performed in the case of other gear ratios instructed. As a result, without losing a current state of the moving vehicle, occurrence of a bigger shock is prevented because a shift occurs to establish a gear ratio most suitable to the current state of the moving vehicle when the automatic transmission fails and presents the neutral state. In addition, when N(PC1)=0 upon determination that the automatic transmission fails and presents a neutral state during driving the vehicle with the instructed gear ratio being the seventh speed, determination is made that the input clutch C1 is disengaged by mistake or the H&LR clutch C3 is disengaged by mistake so that the gear ratios that may be established are the first, second, and third speeds. Here, if a shift occurs to establish the third speed, for example, upon determination that the automatic transmission fails and presents the neutral state during driving the vehicle at high speed with the instructed gear ratio being the seventh speed (high gear ratio), there is the possibility that the current state of the moving vehicle may be lost due to occurrence a bigger shock caused by rapid engine braking. Therefore, if the gear ratios that may be established are low gear ratios only, a neutral state may be maintained temporarily immediately after determination that the automatic transmission fails and presents the neutral state during driving the vehicle at high speed or with high gear ratio, and a shift may be controlled among low gear ratios (the first, second, and third speeds) if the vehicle's speed falls. In other words, a shift control among the lower gear ratios may be prohibited until the vehicle's speed falls. Temporarily maintaining the neutral state in this way can prevent occurrence of a bigger shock without losing the current state of the moving vehicle.

There is description of technical effects. As is clear from the preceding description, the following technical effects are given by the first embodiment of a control apparatus for an automatic transmission.

(1) It is possible to detect the speed of a transmission input shaft surely even if the constitution becomes complicated with multistage of an automatic transmission because, in a control apparatus for an automatic transmission comprising: a planetary gear mechanism G1, G2, G3, G4 that changes a speed of an input shaft "Input" for outputting at an output shaft "Output"; a plurality of frictionally engaging elements C1, C2, C3, B1, B2, B3, B4 that change rotations of rotary members of the planetary gear mechanism selectively; and an ATCU 20 that gives instructions including a combination of engagement of at least one of the plurality of frictionally engaging elements C1, C2, C3, B1, B2, B3, B4 and disengagement of the other of the plurality of frictionally engaging elements C1 C2, C3, B1, B2, B3, B4 so that the automatic transmission could establish a corresponding one of a plurality of gear ratios, there are a first turbine rotary-speed sensor 3 arranged to detect a speed of a second carrier PC2 which turns at a different speed from the input shaft "Input"; a second turbine rotary-speed sensor 4 arranged to detect a speed of a first carrier PC1 which turns at a different speed from the input shaft "Input"; and an input shaft speed calculation section that calculates a speed of the input shaft "Input" using values detected by the both rotary-speed sensors 3 and 4.

(2) It is possible to secure the freedom of selecting gear ratios, which the automatic transmission is allowed to shift to, when the automatic transmission fails and presents a neutral state by determining the frictionally engaging element which is disengaged by mistake and the associated actuator member because, in a control apparatus for an automatic transmission comprising: a planetary gear mechanism G1, G2, G3, G4 that changes a speed of an input shaft "Input" for outputting at an output shaft "Output"; a plurality of frictionally engaging elements C1, C2, C3, B1, B2, B3, B4 that change rotations of rotary members of the planetary gear mechanism G1, G2, G3, G4 selectively; and an ATCU 20 that gives instructions including a combination of engagement of at least one of the plurality of frictionally engaging elements C1, C2, C3, B1, B2, B3, B4 and disengagement of the other of the plurality of frictionally engaging elements C1, C2, C3, B1, B2, B3, B4 so that the automatic transmission could establish a corresponding one of a plurality of gear ratios, there are a first turbine rotary-speed sensor 3 arranged to detect a speed of a second carrier PC2 which turns at a different speed from the input shaft "Input"; a second turbine rotary-speed sensor 4 arranged to detect a speed of a first carrier PC1 which turns at a different speed from the input shaft "Input"; an input shaft speed calculation section that calculates a speed of the input shaft "Input" using values detected by the both rotary-speed sensors 3 and 4; an output shaft speed sensor 5 that detects a speed of the output shaft "Output"; a gear ratio calculation section (step S109) that calculates a gear ratio from the calculated speed of the input shaft "Input" and the detected speed of the output shaft "Output"; a neutral determination section (step S115~step S119) that determines, based on the calculated gear ratio by the gear ratio calculation section, whether or not the automatic transmission fails and presents a neutral state that is established due to occurrence of a disengagement by mistake of a frictionally engaging element including a slip engagement of the frictionally engaging element; and a neutral control section (FIG. 6) that conducts a neutral control by forcing the automatic transmission to shift to a safe (non-malfunction) gear ratio upon the neutral determination section determining that the automatic transmission fails and presents the neutral state when the ATCU 20 gives instructions so that the automatic transmission may establish an appropriate gear ratio for driving, and the neutral control section determines the frictionally engaging element which is disengaged by mistake and the associated actuator member which is designed to activate the frictionally engaging element based on a selected gear ratio, which determines at least one of the plurality of frictionally engaging elements to be engaged, and a relationship between the speeds detected by the first and second turbine rotary-speed sensors 3 and 4.

(3) In addition to securing the freedom of selecting gear ratios, which the automatic transmission is allowed to shift to, when the automatic transmission fails and presents a neutral state, a highly reliable shift control is conducted because the neutral control section (FIG. 6) conducts the shift control without using the frictionally engaging element determined as being disengaged by mistake.

(4) Without losing a current state of a moving vehicle, occurrence of a bigger shock is prevented because the neutral control section (FIG. 6) determines a gear ratio, which a shift should be made to, depending on a vehicle speed at the time when the neutral determination section determines that the automatic transmission fails and presents the neutral state.

Having explained the present invention along with the first embodiment of a control apparatus for an automatic transmission, the concrete constitution of the present invention is not limited to this embodiment, and a change or an addition in design are permitted unless deviated from the sprint of the invention recited by each of the claims.

The first embodiment takes as an example the automatic transmission, which uses, as a gear train, four planetary gear sets, three clutches, four brakes, and two one-way clutches to provide seven forward speeds and one reverse speed. An automatic transmission, which a control apparatus according to the present invention is applicable, is not limited, in the number of planetary gear sets, frictionally engaging elements and forward speeds, to that used in the first embodiment. In particular, a control apparatus according to the present invention is effective when applied to an automatic transmission having a gear train that is difficult to directly detect an input shaft speed by a sensor.

In the first embodiment, there is shown an example in which an automatic transmission of the present invention is applied to an engine driven vehicle, but the present invention may be applicable to a hybrid vehicle having a source of drive including an engine and an electric motor or an automobile having a source of drive that is an electric motor. In brief, the present invention is applicable to any automatic transmissions that have a shift control section that gives instructions including a combination of engagement of at least one of the plurality of frictionally engaging elements and disengagement of the other of the plurality of frictionally engaging elements so that the automatic transmission could establish a corresponding one of a plurality of gear ratios.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control apparatus comprising:

a shift control section configured to issue instructions to selectively engage and disengage a combination of a plurality of frictionally engaging elements of a planetary gear mechanism to establish a corresponding one of a plurality of gear ratios;

a first rotary-speed detecting section configured to detect a rotational speed of a first rotary member of the planetary gear mechanism which rotates at a different speed from an input shaft of the planetary gear mechanism;

a second rotary-speed detecting section configured to detect a rotational speed of a second rotary member of the planetary gear mechanism which rotates at a different speed from the input shaft of the planetary gear mechanism;

an input shaft speed calculation section configured to calculate a rotational speed of the input shaft using values detected by the first and second rotary-speed detecting sections;

an output shaft speed detection section configured to detect a rotational speed of an output shaft of the planetary gear mechanism;

a gear ratio calculation section configured to calculate a gear ratio from the rotational speed of the input shaft calculated by the input shaft speed calculation section and the rotational speed of the output shaft detected by the output shaft speed detection section;

a neutral determination section configured to determine if the automatic transmission has failed and a neutral state has been established due to an occurrence of an engagement malfunction of one the frictionally engaging elements, based on the gear ratio calculated by the gear ratio calculation section; and a neutral control section configured to conduct a neutral control by forcing the automatic transmission to shift to a non-malfunctioning gear ratio upon the neutral determination section determining that the automatic transmission failed and is in the neutral state when the shift control section issues instructions to establish an appropriate one of the gear ratios for driving.

2. The automatic transmission control apparatus as claimed in claim 1, wherein the neutral control section is further configured to determine which one of the frictionally engaging elements has the engagement malfunction based on a selected gear ratio requiring at least one of the frictionally engaging elements to be engaged, and a relationship between the rotational speeds detected by the first and second rotary-speed detecting sections.

3. The automatic transmission control apparatus as claimed in claim 2, wherein
the neutral control section is further configured to conduct a shift control without using the frictionally engaging element determined as having the engagement malfunction.

4. The automatic transmission control apparatus as claimed in claim 1, wherein
the neutral control section is further configured to determine a gear ratio, which a shift should be made to, depending on a vehicle speed at the time when the neutral determination section determines that the automatic transmission has failed and the neutral state has been established.

5. The automatic transmission control apparatus as claimed in claim 2, wherein
the neutral control section is further configured to determine a gear ratio, which a shift should be made to, depending on a vehicle speed at the time when the neutral determination section determines that the automatic transmission has failed and the neutral state has been established.

6. The automatic transmission control apparatus as claimed in claim 3, wherein
the neutral control section is further configured to determine a gear ratio, which a shift should be made to, depending on a vehicle speed at the time when the neutral determination section determines that the automatic transmission has failed and the neutral state has been established.

7. An automatic transmission control apparatus comprising:
shift control means for issuing instructions to selectively engage and disengage a combination of a plurality of frictionally engaging elements of a planetary gear mechanism to establish a corresponding one of a plurality of gear ratios;
first rotary-speed detecting means for detecting a rotational speed of a first rotary member of the planetary gear mechanism which rotates at a different speed from an input shaft of the planetary gear mechanism;
second rotary-speed detecting means for detecting a rotational speed of a second rotary member of the planetary gear mechanism which rotates at a different speed from the input shaft of the planetary gear mechanism;
input shaft speed calculation means for calculating a rotational speed of the input shaft using values detected by the first and second rotary-speed detecting means;
output shaft speed detecting means for detecting a rotational speed of an output shaft of the planetary gear mechanism;
gear ratio calculation means for calculating a gear ratio from the rotational speed of the input shaft calculated by the input shaft speed calculation means and the rotational speed of the output shaft detected by the output shaft speed detection means;
neutral determination means for determining if the automatic transmission has failed and a neutral state has been established due to an occurrence of an engagement malfunction of one the frictionally engaging elements, based on the gear ratio calculated by the gear ratio calculation means; and
neutral control means for conducting a neutral control by forcing the automatic transmission to shift to a non-malfunctioning gear ratio upon the neutral determination means determining that the automatic transmission has failed and is in the neutral state when the shift control section issues instructions to establish an appropriate one of the gear ratios for driving.

8. A method of controlling an automatic transmission comprising:
issuing instructions to selectively engage and disengage a combination of a plurality of frictionally engaging elements of a planetary gear mechanism to establish a corresponding one of a plurality of gear ratios;
detecting a first rotational speed of a first rotary member of the planetary gear mechanism which rotates at a different speed from an input shaft of the planetary gear mechanism;
detecting a second rotational speed of a second rotary member of the planetary gear mechanism which rotates at a different speed from the input shaft of the planetary gear mechanism;
calculating a rotational speed of the input shaft using values of the first and second rotational speeds that were detected;
detecting a rotational speed of an output shaft of the planetary gear mechanism;
calculating a gear ratio from the rotational speed of the input shaft that was calculated and the rotational speed of the output shaft that was detected;
determining if the automatic transmission has failed and a neutral state has been established due to an occurrence of an engagement malfunction of one the frictionally engaging elements, based on the gear ratio that was calculated; and
conducting a neutral control by forcing the automatic transmission to shift to a non-malfunctioning gear ratio upon determining that the automatic transmission has failed and is in the neutral state when instructions are issues to establish an appropriate one of the gear ratios for driving.

* * * * *